United States Patent

Pritschow et al.

[11] Patent Number: 5,960,672
[45] Date of Patent: Oct. 5, 1999

[54] DEVICE FOR GENERATING A DEFINED POSITION AND ORIENTATION OF AT LEAST ONE PLATFORM

[75] Inventors: Günter Pritschow, Stuttgart; Karl-Heinz Wurst, Korntal-Münchingen, both of Germany

[73] Assignee: VDW Verein Deutscher Werkzeugmaschinenfabriken e.V., Frankfurt, Germany

[21] Appl. No.: 08/844,708

[22] Filed: Apr. 18, 1997

[51] Int. Cl.[6] .................................................. G05G 11/00
[52] U.S. Cl. ................................... 74/490.07; 74/490.03; 901/23
[58] Field of Search ........................... 74/490.07, 490.03, 74/490.01, 490.05; 901/16, 23, 28

[56] References Cited

U.S. PATENT DOCUMENTS

| | | | |
|---|---|---|---|
| 4,872,363 | 10/1989 | Rosenthal | 74/490.07 |
| 5,333,514 | 8/1994 | Toyama et al. | 74/490.03 |
| 5,421,695 | 6/1995 | Kimura | 74/490.03 |
| 5,603,243 | 2/1997 | Finley | 74/490.03 |
| 5,771,747 | 6/1998 | Sheldon | 74/490.01 |
| 5,787,758 | 8/1998 | Sheldon | 74/490.07 |

*Primary Examiner*—Tamara L. Graysay
*Assistant Examiner*—David M. Fenstermacher
*Attorney, Agent, or Firm*—Robert W. Becker & Associates

[57] ABSTRACT

A device for generating a defined position and orientation of at least one platform includes rod elements arranged in at least one four-bar linkage. The at least one four-bar linkage is pivotably connected to the platform. The angular position of the at least one four-bar linkage is motorically adjustable for changing an orientation of the platform.

18 Claims, 32 Drawing Sheets

DEVICE FOR GENERATING A DEFINED POSITION AND ORIENTATION OF AT LEAST ONE PLATFORM

BACKGROUND OF THE INVENTION

The invention relates to a device for generating a defined position and orientation of at least one platform to which are connected rod elements in a pivotable manner.

It is known to move a platform in so-called octahedral machines with the aid of six telescopic legs. They allow the movement in six independent degrees of freedom. The telescopic legs are supported in ball joints or gimbal-type joints and are driven by threaded spindles, planetary roll spindles or linear direct drives. The drives are for this purpose integrated into the telescopic legs. Between the end points at the platform and the stationary base frame the telescopic legs thus enclose a triangular area. The joints are arranged at the stationary frame such that the connecting lines, that are formed by the delimiting lines of the triangular area, describe a hexagon. All telescopic legs are connected with one of their ends with non-displaceable joints to the stationary base frame and with their other ends with non-displaceable joints to the platform. All telescopic legs are length-adjustable with a drive between the respective joints. The threaded spindles being used have play, are mechanically yielding, and thus allow only for a limited dynamic in a position control circuit, respectively, only a limited positioning precision. Since in each one of the telescopic legs numerous mechanical elements for generating the movement and for transmission of the movement are provided, these elements must also be accelerated by the respective motor of the telescopic leg for generating a movement. This reduces the possible acceleration capability for the platform. A change of the orientation of the platform can only be achieved with additional elements, the position of which is motorically changed and which simultaneously are coupled to the positioning process. Thus, even for a constant orientation of the platform, all telescopic legs must follow the positional change.

It is therefore an object of the present invention to embody the aforementioned device such that the platform can be positioned with high precision and high acceleration in a simple manner into the respective position and/or orientation.

SUMMARY OF THE INVENTION

The device for generating a defined position and orientation of at least one platform according to the present invention is characterized by comprising rod elements arranged in at least one four-bar linkage, the at least one four-bar linkage pivotably connected to the platform, wherein an angular position of the at least one four-bar linkage is motorically adjustable for changing the orientation of the platform.

Advantageously, at least one of the rod elements of the four-bar linkage is motorically adjustable for changing the angular position.

The device may further comprise a rotary drive for adjusting the angular position.

The at least one rod element is preferably rotatable by the rotary drive about a rotary axis extending angularly to the rotary drive.

The rotary axis extends preferably perpendicularly to the rotary drive.

The at least one rod element is motorically length-adjustable for changing the angular position.

The device may further comprise a rectilinear sliding joint for length-adjusting the at least one length-adjustable rod element.

The rectilinear sliding joint is positioned within the at least one length-adjustable rod element.

The device may also comprise at least one connecting arm, wherein the rectilinear sliding joint is connected with the at least one connecting arm to the at least one length-adjustable rod element.

Preferably, the angular position is adjustable by rotating at least one rotatable part of one of the at least one rod elements about a longitudinal axis of the at least one rod element.

Preferably, the device further comprises a rotary drive positioned within one of the at least one rod elements for rotating the at least one rotatable part relative to a remaining part of the at least one rod element.

Preferably, the at least one four-bar linkage has a plane rest position and is movable out of the plane rest position in a direction transverse to the plane rest position.

The device advantageously further comprising a rotary drive, wherein one of the at least one rod elements has a transverse center axis, extending perpendicularly to a longitudinal extension of the one rod element, and is rotatable by the rotary drive about the transverse center axis.

Preferably, the device further comprises a rotary drive and a rectilinear sliding joint connected to one of the rod elements.

Preferably, the device comprises at least two of the four-bar linkages for supporting the platform.

The device may also comprise at least one linear drive, connected to one of the four-bar linkages, for positioning the platform.

The device may comprise two of the linear drives, wherein two of the rod elements of the one four-bar linkage are pivotably connected to one of the linear drives, respectively.

The device further may comprise a common linear guide, wherein the two linear drives are displacable on the common linear guide.

In the inventive device, the rod elements are part of a four-bar linkage, the angular position of which can be motorically adjusted. The rod elements are connected to one another via linkage points (pivot points) whereby the angular position of the rod elements and thus of the platform can be motorically adjusted at the linkage points (pivot points). The drives for the positioning and orientation of the platform are decoupled so that, for example, for a constant orientation only a position change of the platform can be performed. The inventive device is characterized by an especially constructively simple device.

BRIEF DESCRIPTION OF THE DRAWINGS

The object and advantages of the present invention will appear more clearly from the following specification in conjunction with the accompanying drawings, in which:

FIG. 18*b* shows the device according to FIG. 18 in a displaced position;

DESCRIPTION OF PREFERRED EMBODIMENTS

The present invention will now be described in detail with the aid of several specific embodiments utilizing FIGS. 1 through 20.

With the devices disclosed in the following spatial kinematic machine designs can be embodied in order to move a platform with up to six degrees of freedom within a space. The platform can be a tool support or a workpiece support of a machine tool. It is also possible to move the tool support and the workpiece support with seperate kinematic mechanisms.

The devices are comprised of four-bar linkages that can have different designs.

Figure 1:
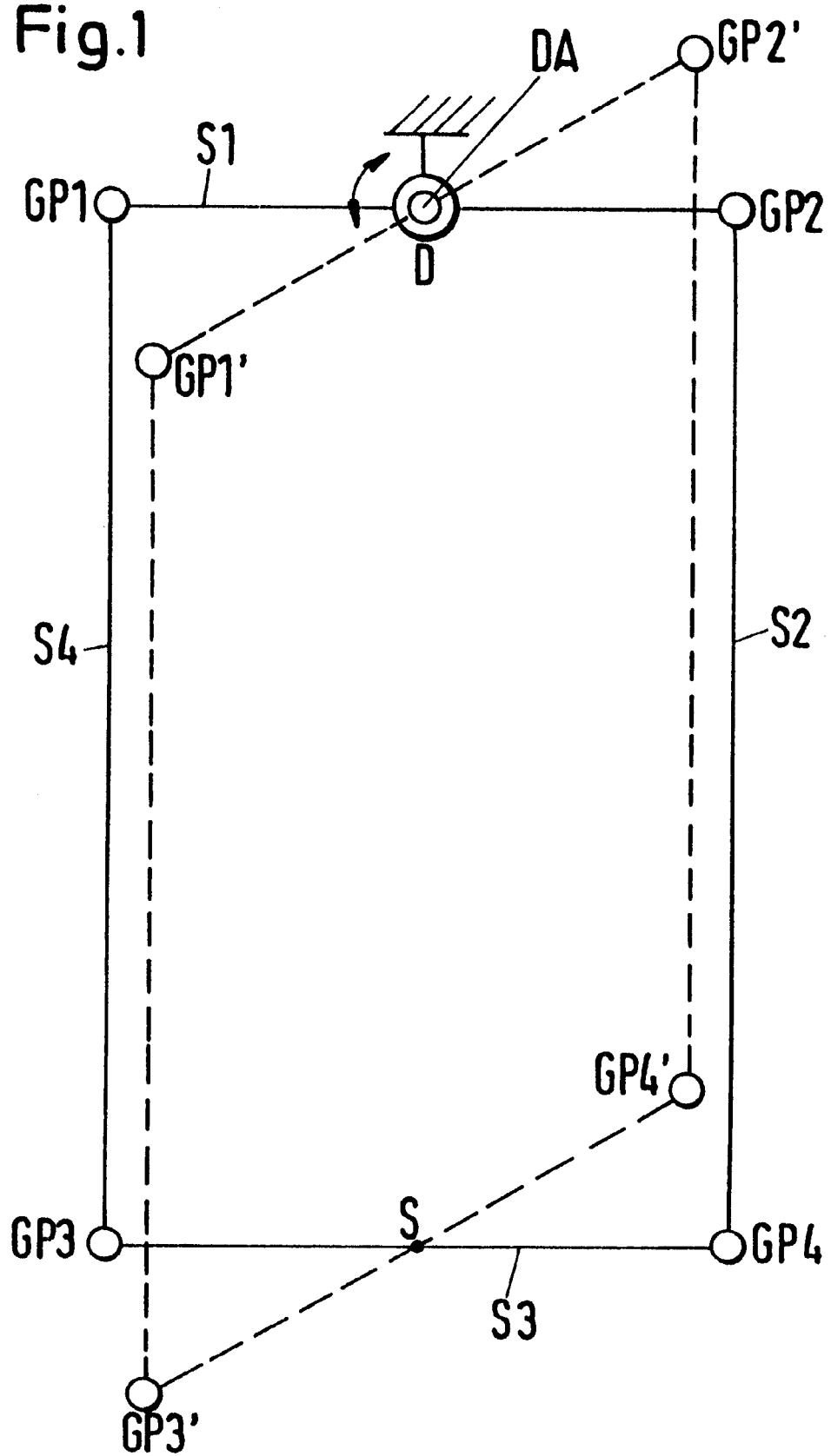
FIG. 1 is a schematic representation of a drive system in the form of a four-bar linkage for the inventive device.

FIG. 1 shows such a four-bar linkage comprised of four rod elements (rods) S1 to S4. The rods are positioned at a right angle to one another and at their ends are connected to one another by pivot points (linkage points) GP1 to GP4. The angular position of the four-bar linkage at the pivot points GP1 to GP4 can be adjusted by drives. For this purpose, a rotary drive (motor) D is provided which is stationarily arranged, especially at the machine, and which has the axis of rotation DA. The direction of rotation of the rotary motor D is indicated in FIG. 1 with double arrows. By a counter-clockwise rotation, the position of the four-bar linkage indicated in dashed lines in FIG. I is reached. Since the rods S1 to S4 are pivotably connected to one another, the rods can be pivoted relative to one another by the required amount. The rod element S3 is guided in a forced manner by a non-represented platform which will be explained in detail in the following. This forced guiding location is indicated symbolically with the letter S in FIG. 1. The pivot points of the displaced position are indicated with GP1' and GP4'.

Figure 2:
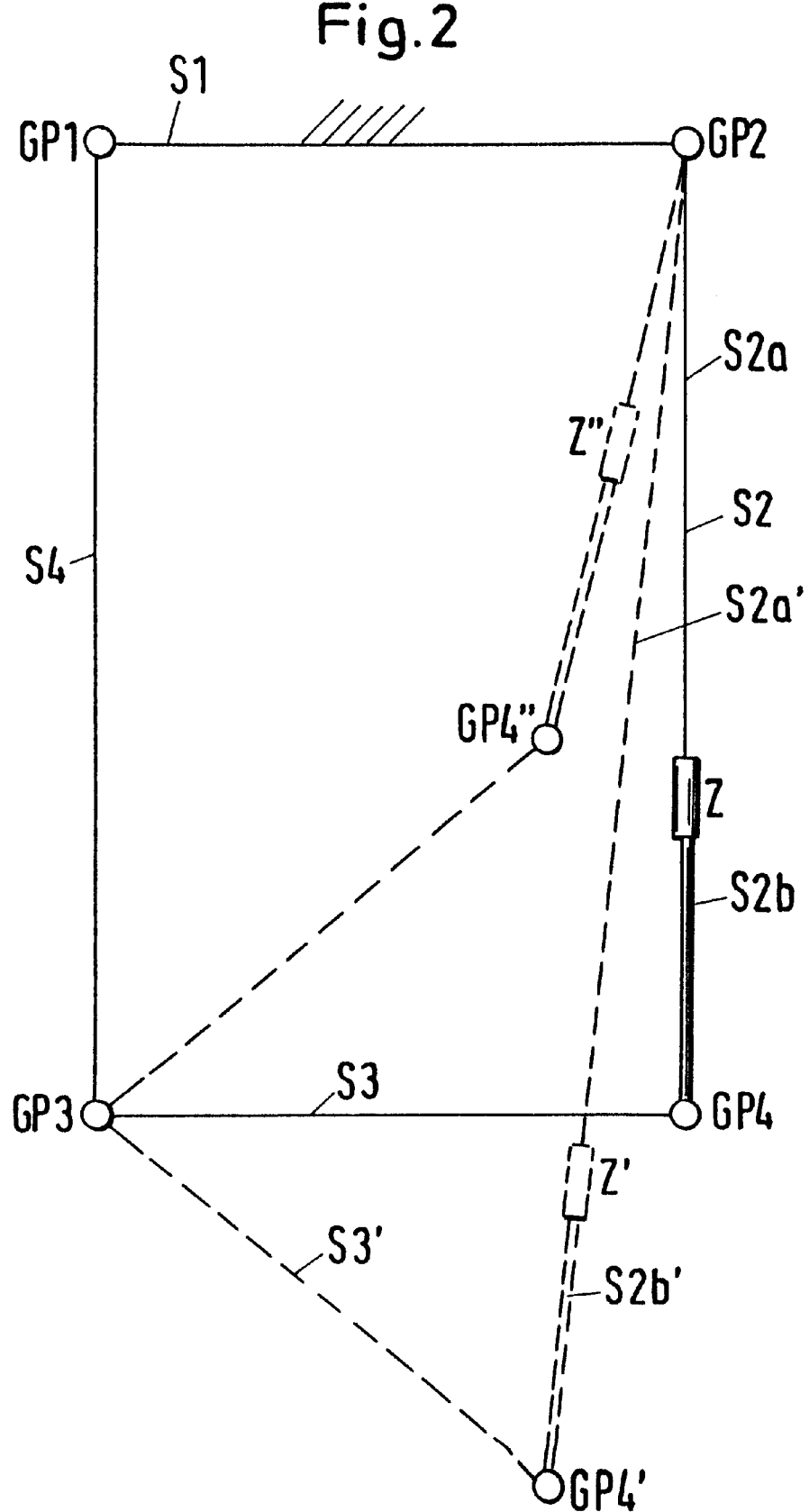
FIG. 2 is a second embodiment of a four-bar linkage of the inventive device in a representation corresponding to FIG. 1.

In the embodiment according to FIG. 2 the change of the angular position of the four-bar linkage takes place with a length-adjustable rod. The rods S1 to S4 are connected at their ends by pivot points GP1 to GP4. The rod S1 is stationarily arranged. Within the rod S2 a drive Z is provided with which the length of the rod S2 can be changed. The drive Z can be a piston/cylinder unit, a ball roll spindle and similar devices. In this case, the rod S2 is comprised of rod parts S2*a* and S2*b* that are displaceable relative to one another.

In FIG. 2 two different positions of the four-bar linkage are represented in dashed lines. When the drive Z is actuated so that the length of the rod S2 is increased, the drive is moved into the position Z'. By doing so, the rod part S2*a* has been pivoted relative to the rod S1 about the pivot point GP2 so that now the position S2*a*' has been reached. The angular position of the rod S3 has also been changed by the length adjustment of the rod S2. The rod S3 is pivoted about the pivot point GP3 in space whereby the pivot point GP4 has been moved into the position GP4'.

When the drive Z is actuated such that the length of the rod S2 is shortened, then the drive is moved into the position Z". Since the rod S2 has been shortened, the rod S3 must pivot about the pivot point GP3 and about the pivot point GP4. In the shown embodiment, the pivot point GP3 is stationary so that, for a constant length of the rod S3, the pivot point GP4 upon shortening of the rod S2 is moved in to the spatial position GP4" and upon increase of the length of the rod S2 into the spatial position GP4'. The rod S1 in this embodiment is again stationary.

Figure 3:
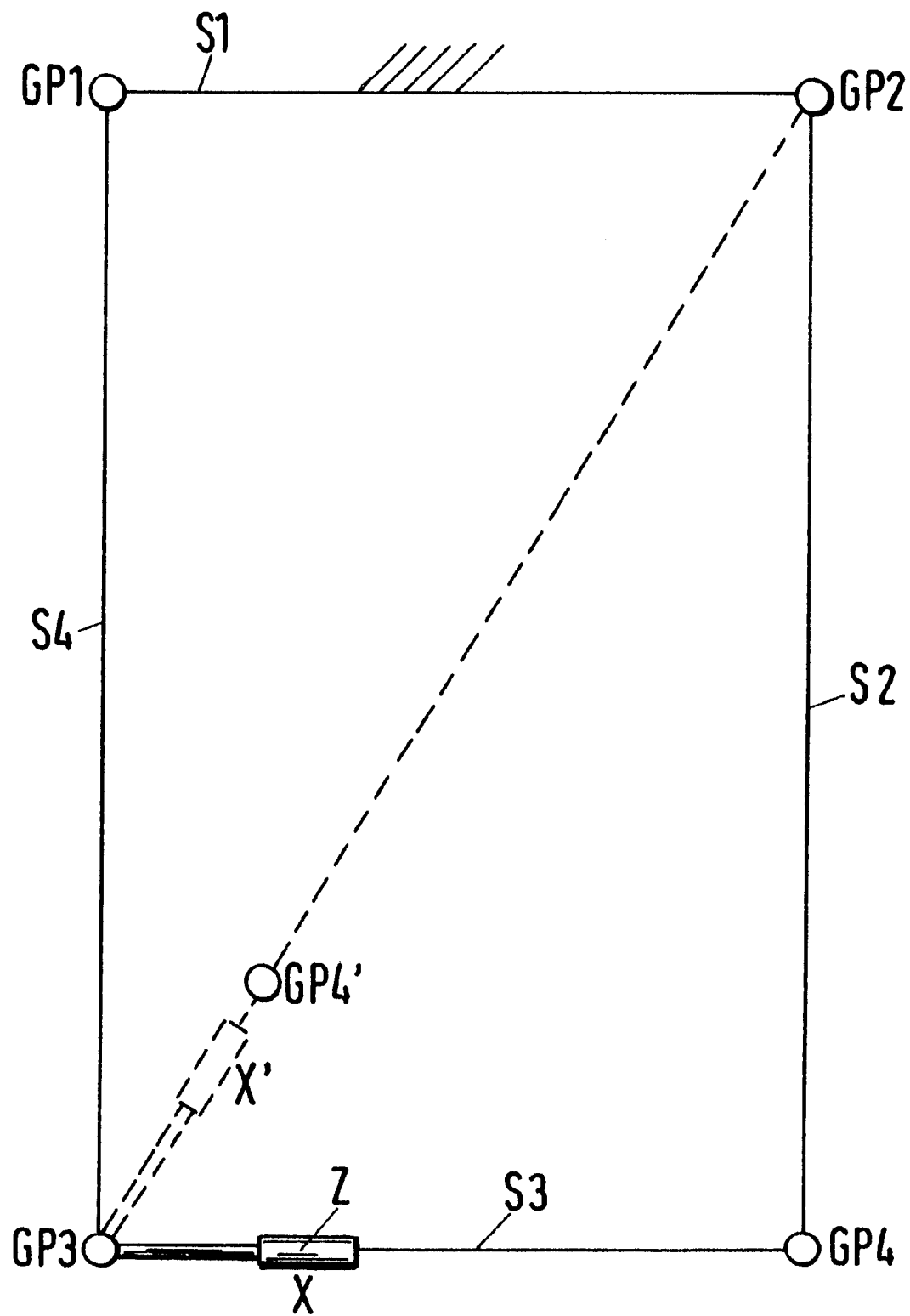
FIG. 3 is a third embodiment of a four-bar linkage of the inventive device.

FIG. 3 shows an embodiment of a four-bar linkage in which the drive Z is provided at the rod S3 so that its length can be adjusted. The rod S1 is again stationary, respectively, is fastened to the frame. In FIG. 3 the dashed lines indicate a position in which the drive Z has changed the length of the rod S3. As in the previous embodiment, the other rods are of constant length so that the spatial position of the pivot point GP4 as well as of the rods S2 and S3 is changed.

When the aforedisclosed four-bar linkages are used within the device to be disclosed infra, a platform P is provided instead of the rod S3. Insofar as its positioning is carried out by a length change of the rods, an arrangement according to FIG. 4 or FIG. 5 is especially suitable.

Figure 4:
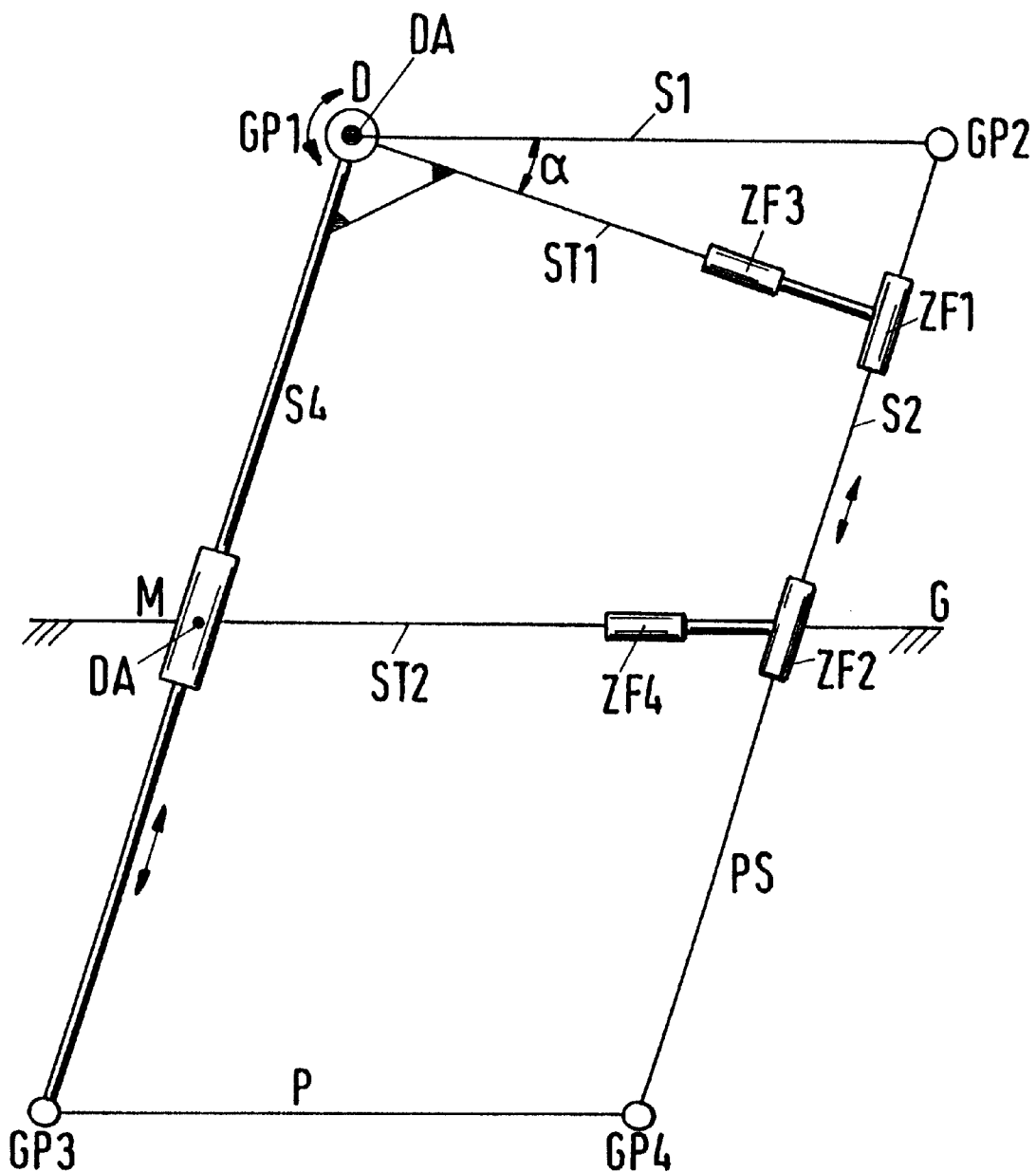
FIG. 4 is a fourth embodiment of a four-bar linkage of the inventive device in a representation corresponding to FIG. 1.
Figure 5:
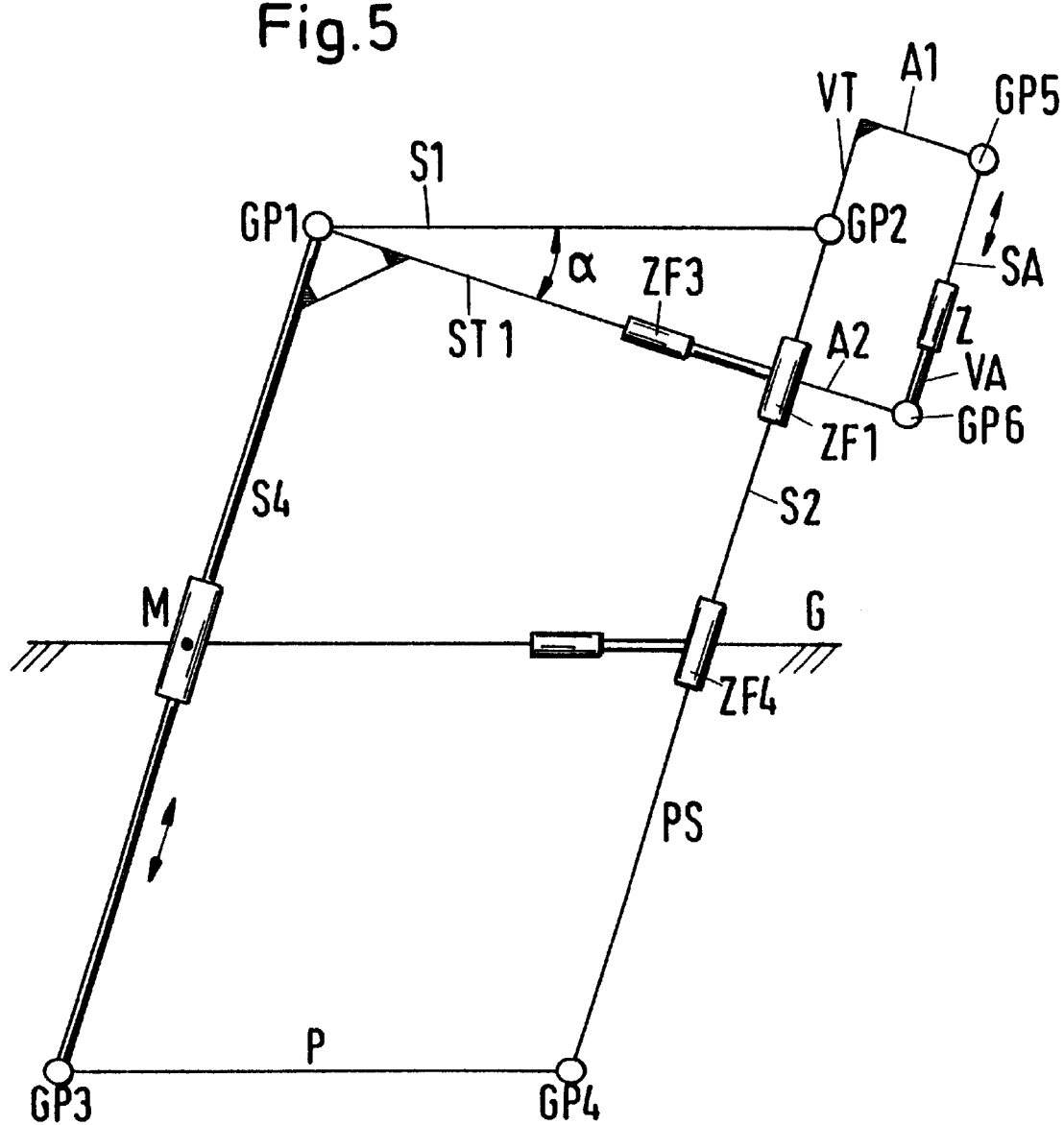
FIG. 5 is a fifth embodiment of a four-bar linkage of the inventive device.

The length change of the position-determining rod S4 in FIG. 4 is performed with the motor M which is rotatably supported at the frame G so as to rotate about the axis DA. The rod S4 is connected at pivot point GP1 to the rod S1. Its end is connected via pivot point GP2 to the rod S2 which is connected at the other end via the pivot point GP4 to the platform P. To the platform P the rod S4 is also connected via pivot point GP3. The rod S2 can be force-guided with the rotary guide D about an angle A into the correct parallel position to the rod S4. For this purpose, the rod S2 is provided with two guides ZF1 and ZF2 which are in the form of sleeves. The guide ZF1 is positioned on a rod ST1 that extends perpendicularly to the rod S4. On this rod ST1 the rotary drive D is supported. The rod ST1 is angularly fixedly connected with the rod S4 which in the shown embodiment is a spindle. When the motor M is actuated, then the rod S4 is displaced in the direction of the double arrow in FIG. 4 in its axial direction. A further guide ZF3 is provided for the rod ST1 which is also preferably embodied as a sleeve and which is rigidly connected to the guide ZF1. The axes of the two guides ZF1 and ZF3 are positioned perpendicularly to one another in a plane.

The guide ZF2 is fixedly connected to a further guide ZF4 that is connected with rod ST2 to the motor M. The axis of the guide ZF4 which is also sleeve-shaped, is positioned at an angle that differs from 90° to the axis of the guide ZF2.

When the rod S1 is rotated by rotary motor D about the rotational axis DA, which is positioned perpendicularly to the rod S4, then it is ensured by the guides ZF1, ZF2 that the rod S2 remains parallel to the rod S4. Since upon displacement of the rod S1 the distance between the parallel rods S2 and S4 is changed, the rods ST1 and ST2 can be retracted into or moved out of the guides ZF3 and ZF4. The motor M, which is rotatably supported at the frame G, can be pivoted about the rotational axis DA which extends parallel to the rotational axis DA of the rotary motor D.

Due to the pivoting of the rod S1 by the rotary drive D, the platform P is moved into the desired position which is the result of the sum of the rotational positions of the rods S4 to the base frame G and the desired rotation of the platform P relative to the base frame G.

The motor M can be a piston/cylinder unit, a ball roll spindle etc.

In the embodiment according to FIG. 5, the rod S1 is not moved by a rotary drive but by a linear drive Z. It is provided in an auxiliary branch of the four-bar linkage. The rod S2 extends past the pivot point GP2. To this extension VT one end of an arm A1 is fixedly connected and the other end of which is connected pivotably via pivot point GP5 to the control arm SA in which the drive Z is located. This control arm SA may be a piston rod of the piston/cylinder unit (drive Z). By retracting or extending this control arm SA, the arm A1 displaces the rod S2 in its longitudinal direction.

The drive Z is positioned on a connecting arm VA which is pivotably connected with pivot point GP6 to an arm A2 that is rigidly connected to the guide ZF3. The arm A2 is positioned on an extension of the rod ST1. Otherwise, the four-bar linkage is of the same construction as the embodiment of FIG. 4.

By retracting or extending the control arm SA the rod S1 is pivoted about the pivot point GP1 by the desired angle A. The guides ZF1 and ZF2 ensure, as in the previous embodiment, that the rod S2 is positioned parallel to the rod S4. Otherwise, the function of this four-bar linkage is identical to that of the embodiment of FIG. 4.

The drive Z is supported on the rod ST1 which is positioned perpendicularly to the rod S4 and is fixedly connected thereto. Both rods ST1 and S4 are pivotable by the pivot point GP1 when the rod S1 is pivoted with the drive Z about the desired angle αC. The drive Z is also supported on the rod ST1 which extends perpendicularly to the rod S4. In this embodiment the position of the platform P also results from the sum of the rotational positions of the rod S4 relative to the base frame G and the desired rotation of the platform P relative to the base frame G.

Figure 6:
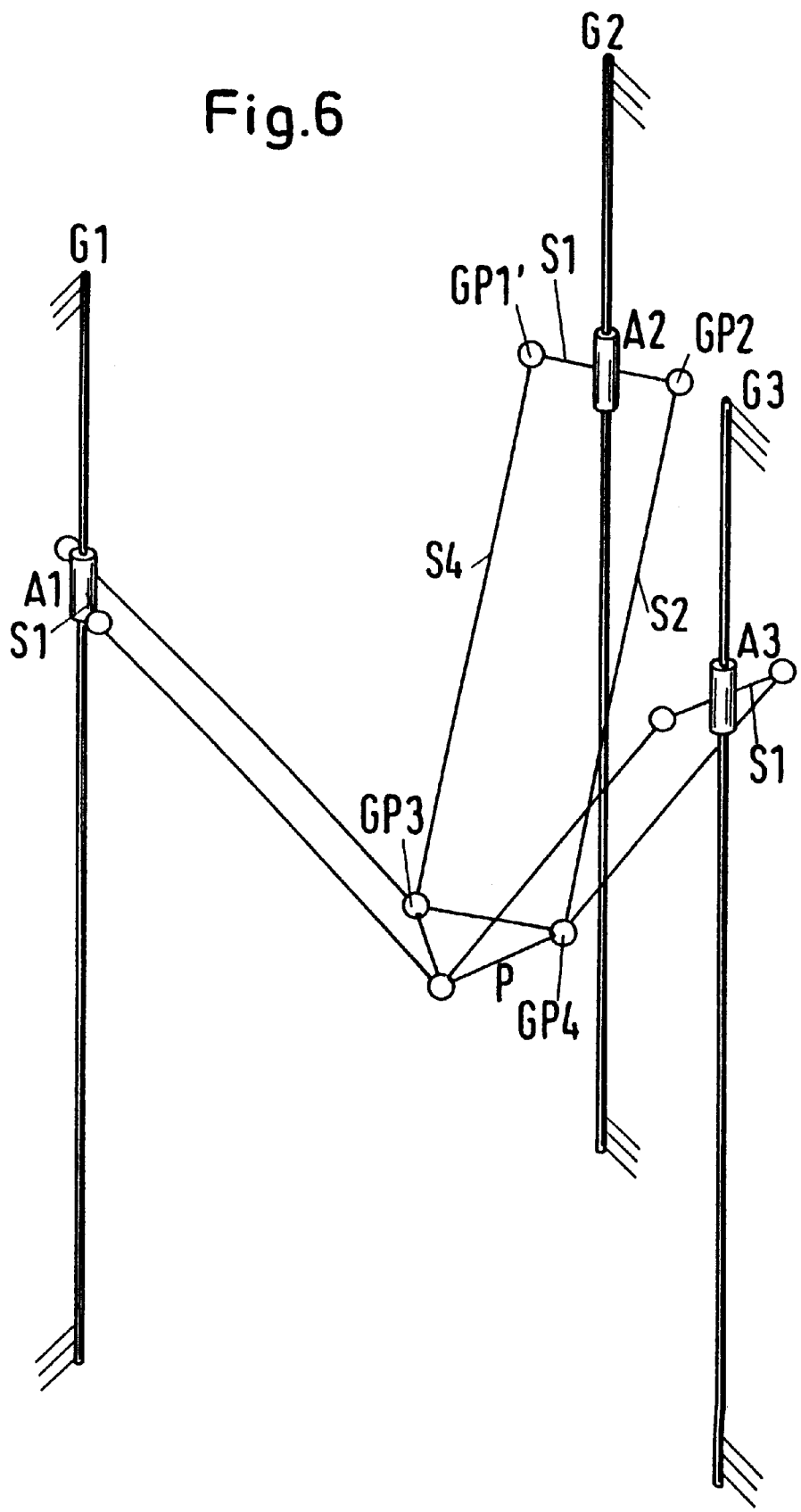
FIG. 6 is a schematic representation of the inventive device with three four-bar linkages.
Figure 6A:
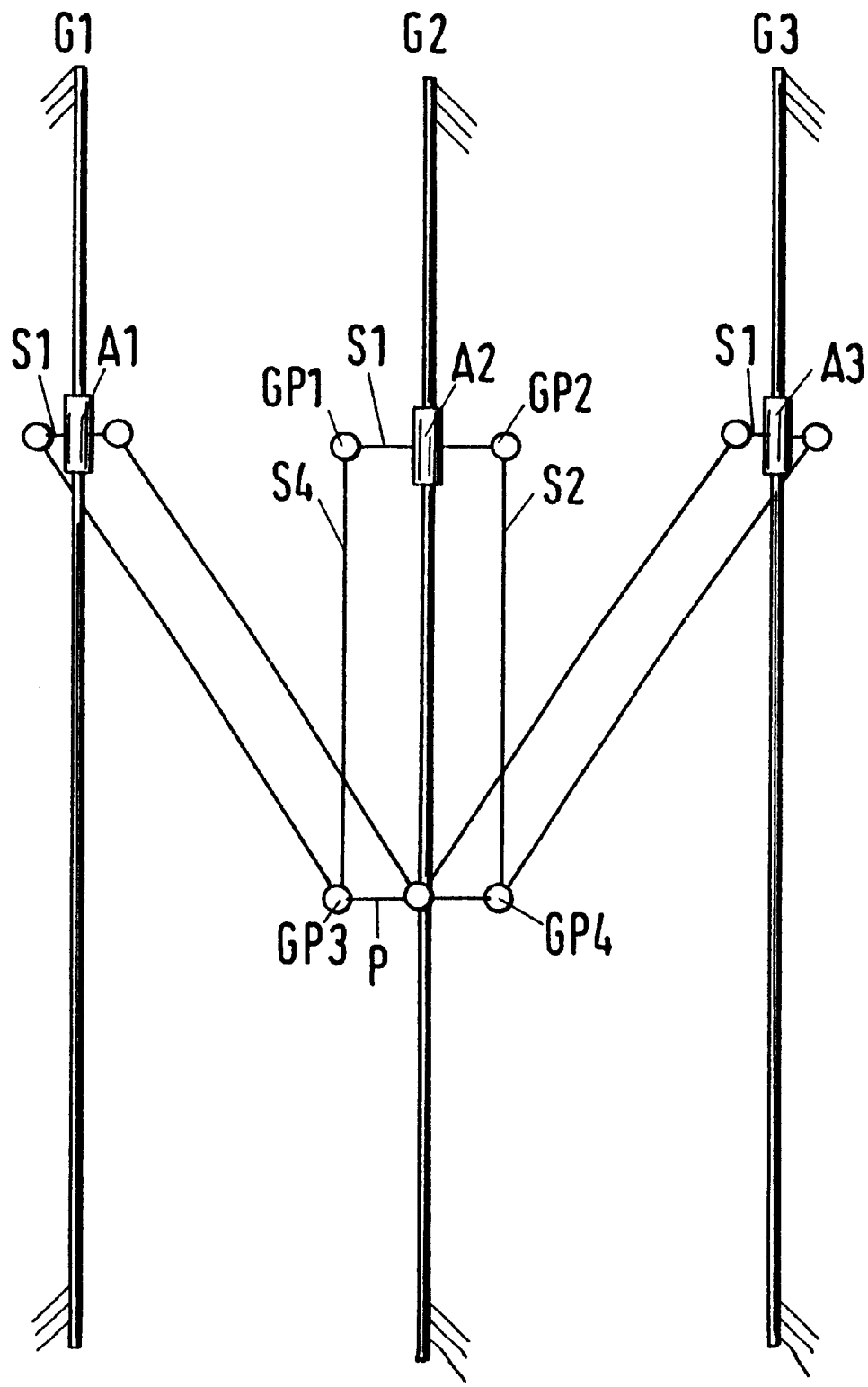
FIG. 6*a* is a front view of the device of FIG. 6.
Figure 6B:
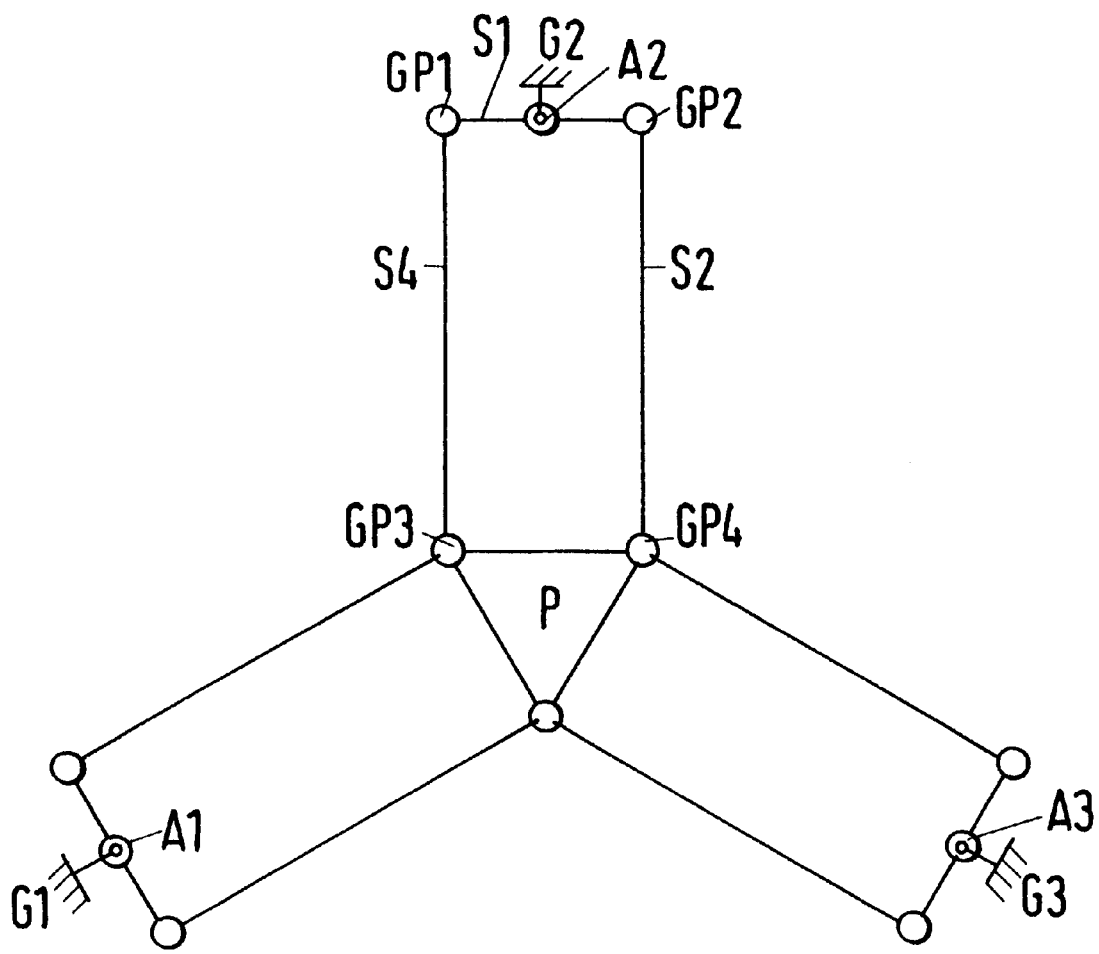
FIG. 6*b* is a plan view of the device according to FIG. 6.

FIG. 6 shows a device in which three four-bar linkages are provided in order to adjust the desired spatial position of the platform P. These four-bar linkages are embodied according to the embodiment of FIG. 1. Each four-bar linkage is displacable with a linear drive A1 to A3 longitudinally relative to a respective linear guide G1 to G3 fixedly connected to the frame. The linear guides G1 to G3 extend parallel to one another. The linear guides G1 to G3, of course, can also be arranged at an angle to one another. This is also true for the further embodiments to be disclosed. At each linear drive A1 to A3 a rod S1 of each one of the four-bar linkages is supported so as to be rotatable about its axis. As disclosed in connection with FIG. 1, each rod S1 is pivotably connected via pivot points GP1 and GP2 at its ends to the rods S2 and S4 which are, in turn, connected pivotably via the pivot points GP3 and GP4 to the platform P. The neighboring four-bar linkages are connected respectively via two pivot points with the platform P. In FIG. 6, in order to simplify the drawing, neighboring pivot points are shown as a common pivot point.

The pivot points GP1 to GP3 are ball joints so that the rods can assume any desired position relative to one another.

The linear guides G1 to G3 are advantageously triangularly arranged. Depending on the desired spatial position of the platform P at least one linear drive is displaced along the correlated linear guide. When, for example, the linear guide A1 is displaced in the downward direction along the linear guide G1 in FIG. 6, while the linear drives A2, A3 maintain their shown position, the platform P is pivoted correspondingly about the pivot points with the four-bar linkages coordinated with the linear drives A2, A3. In this manner, two or all three linear drives can be displaced in order to adjust the platform P in the desired spatial position.

Figure 7:
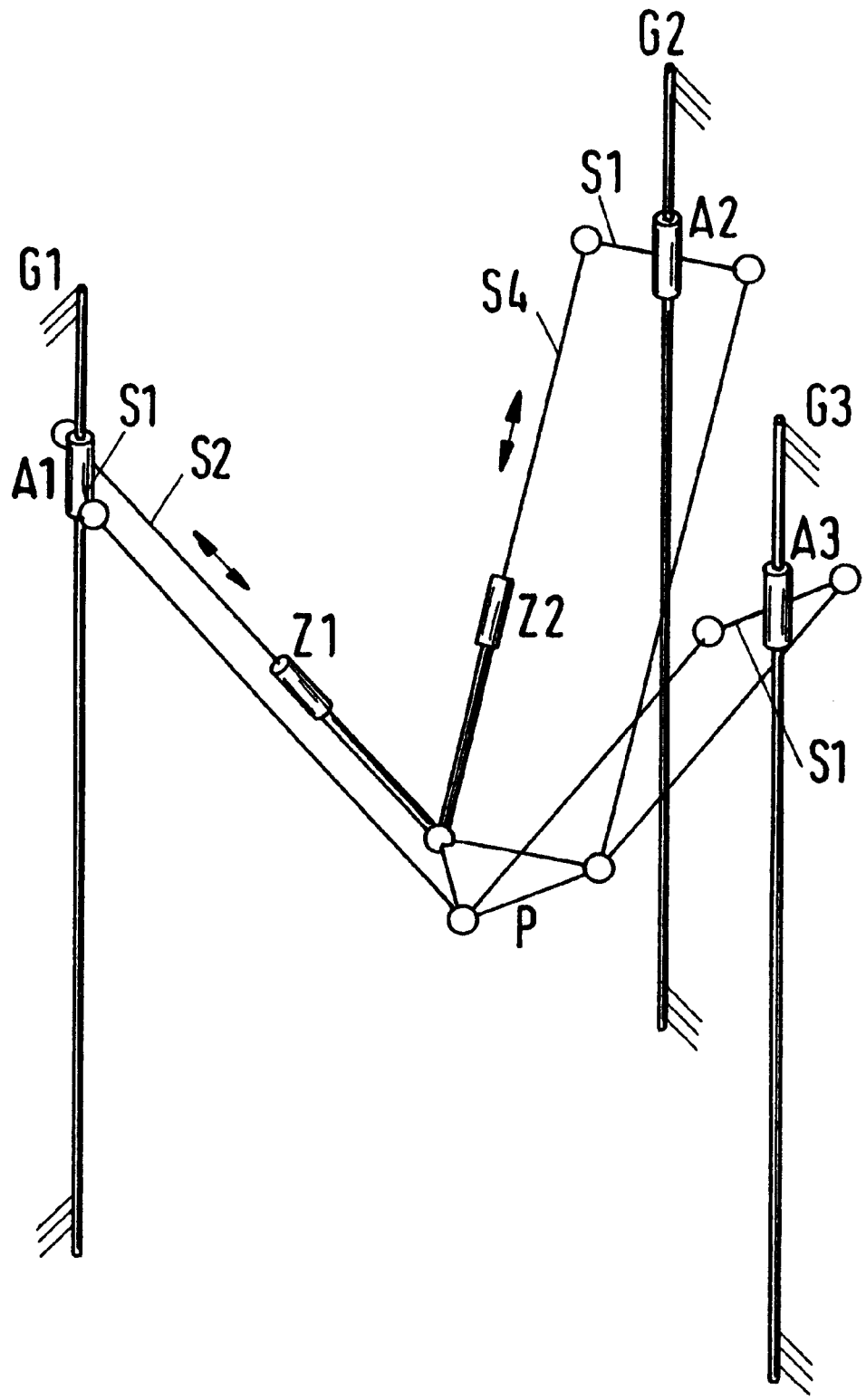
FIG. 7 is a simplified, perspective representation of a further embodiment of the inventive device.

In the device according to FIG. 7, one four-bar linkage corresponding to FIG. 1 and two four-bar linkages according to FIG. 2 are used. The device has parallel-extending linear guides G1 to G3 fixedly connected to the base frame on which guides a respective linear drive A1 to A3 is displaceable. The three four-bar linkages support the platform P which is pivotably connected with the four-bar linkages. As in the previously disclosed embodiment, the linear drives A1 to A3 have connected thereto the rods S1 so as to be rotatable about their axis. The four-bar linkage coordinated with the linear drive A1 comprises at the rod S2 the drive Z1 with which the length of rod S2 can be changed in the manner disclosed. At the rod S4 of the four-bar linkage, correlated with the linear drive A2, the drive Z2 with which the length of the rod S4 can be changed is arranged. With a directed length adjustment of the rods S2 and/or S4 the slanted position of the platform P can be changed in the desired manner. Furthermore, the position of the platform P in space can also be changed by displacement of the linear drives A1 to A3, optionally in combination with the longitudinal displacement of at least one of the rods S2 or S4. The device according to FIG. 7 thus represents a unit with four axes. In FIG. 7 the platform P is shown in a horizontal position.

Figure 8:
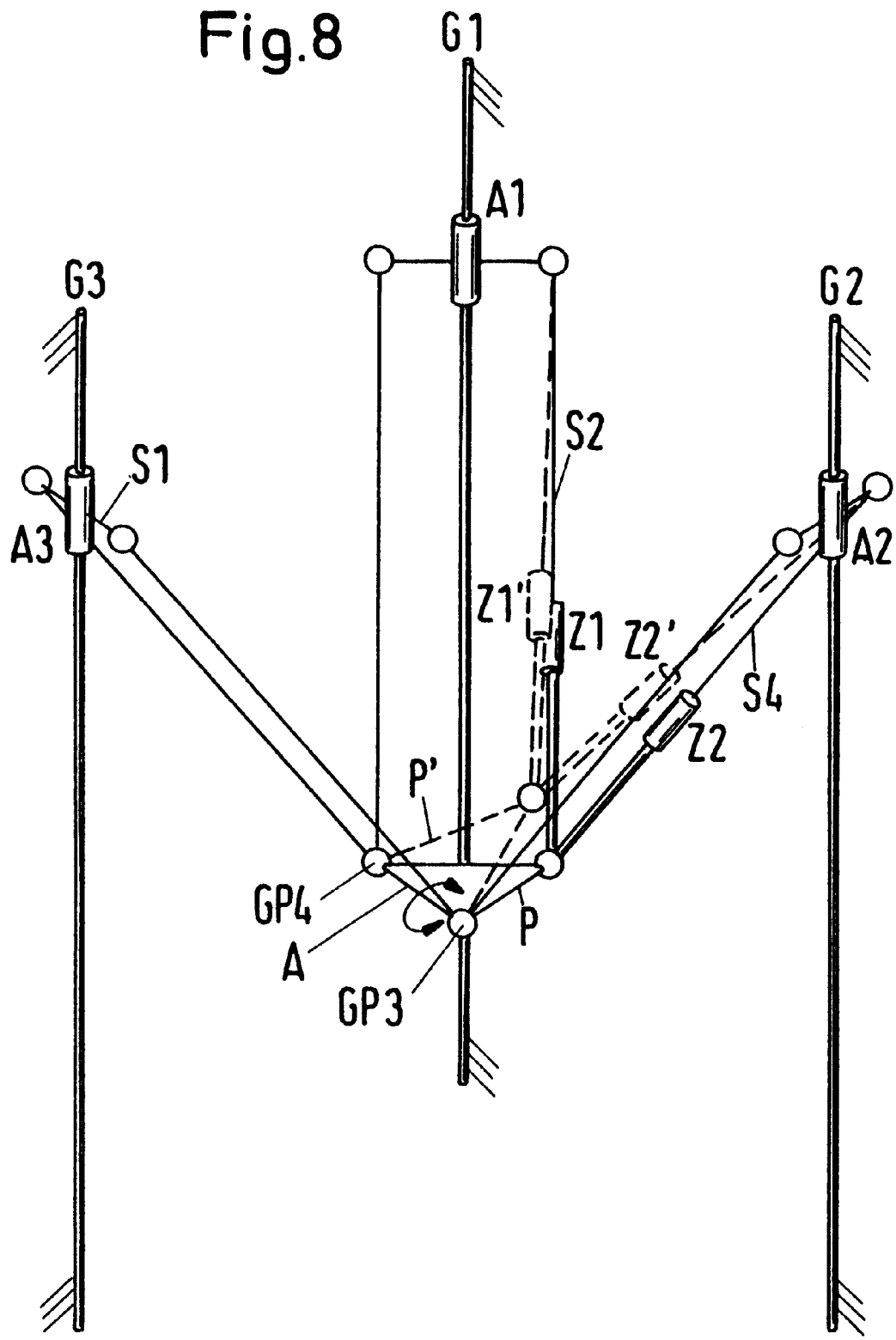
FIG. 8 is a further embodiment of the inventive device in a simplified perspective representation.

FIG. 8 shows in solid lines the device in the same position as in FIG. 7. With dashed lines the position is shown when the length of the rods S2 and S4 has been changed with the drives Z1 and Z2. With the drive (motor) Z1 the rod S2 has been shortened so that the platform P has been lifted at the corresponding connecting side. The length of the rod S4 has been changed with the drive Z2 correspondingly. The platform P thus assumes the slanted position P'. The four-bar linkage coordinated with a linear drive A3, if it is necessary, can also be pivoted about the axis of the rod S1 relative to the linear drive A3. In addition, the linear drives A1 to A3 can be displaced along the linear guides G1 to G3 in order to achieve the desired spatial position of the platform P. With the disclosed longitudinal change of the rods S2, S4, the platform P is pivoted about the axis A which extends through the two pivot points GP3 and GP4.

Figure 9:
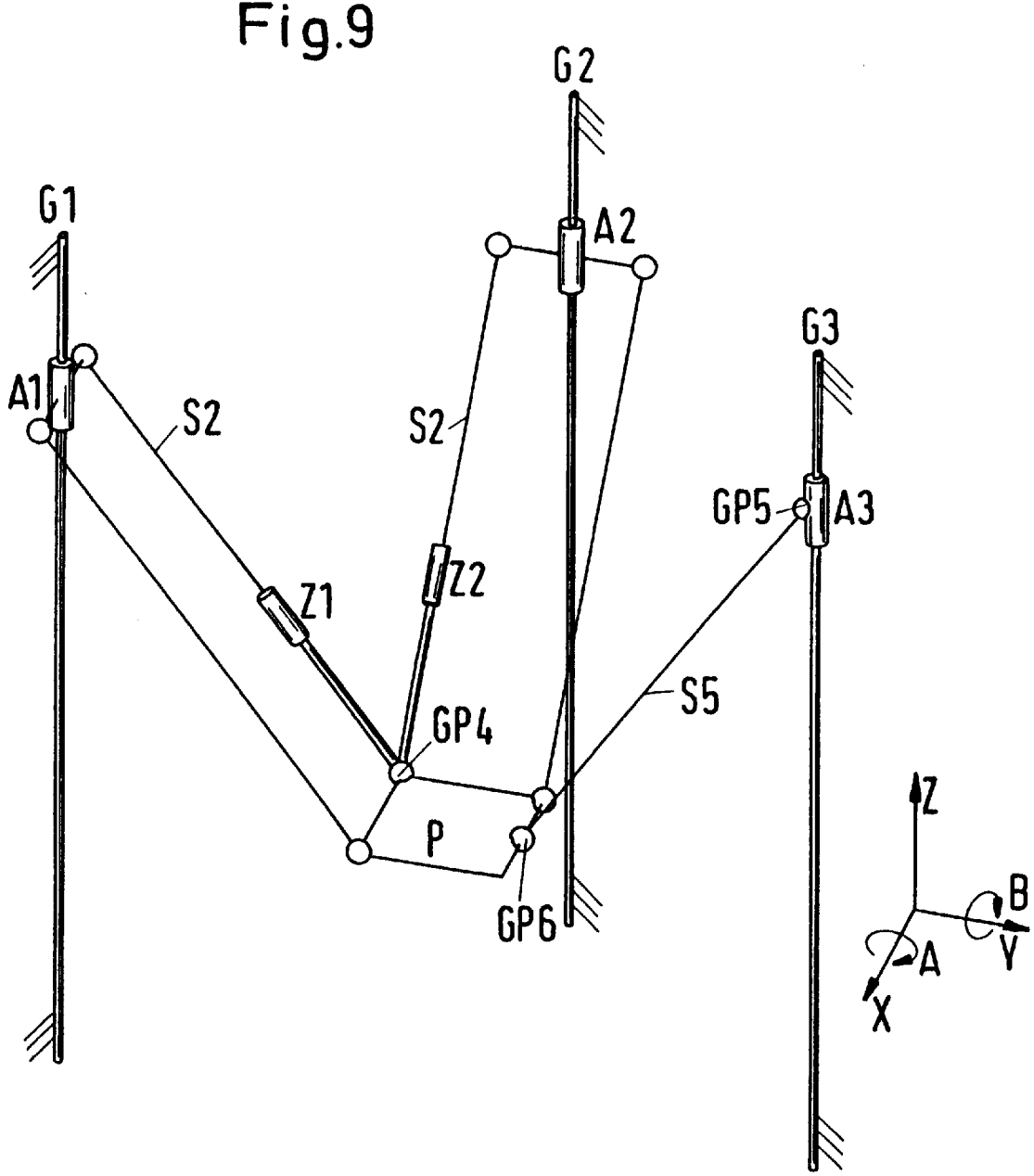
FIG. 9 in a representation according to FIG. 8 shows a further embodiment of the inventive device.
Figure 9A:
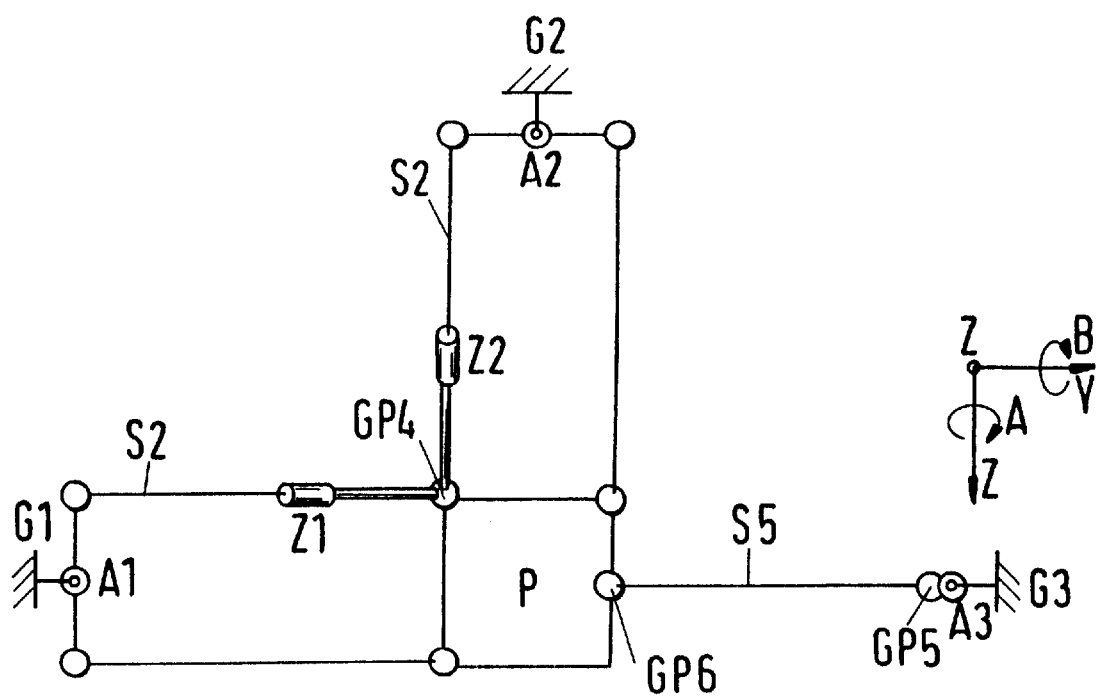
FIG. 9*a* shows a plan view onto the device according to FIG. 9.

In the device according to FIG. 9 two four-bar linkages according to FIG. 2 are provided which are displaceable with the linear drives A1 and A2 along the parallel linear guides G1 and G2. A respective rod S2 of the two four-bar linkages is length-adjustable by the drives Z1, Z2 in the manner disclosed above. On the linear guide G3 which extends parallel to the linear guides G1 and G2, the linear drive A3 is positioned which is connected pivotably to the platform P via only one rod S5. The rod S5 is connected by pivot point GP5 to the linear drive A3 and by pivot point GP6 to the platform P. This pivot point GP6 is, for example, provided at half the width of the corresponding edge of the platform P. The rods S2 of the four-bar linkages having the drives Z1, Z2 are pivotably connected to the platform P. When with the drive Z1 the length of the four-bar linkage correlated with the linear drive A1 is changed, the platform P is pivoted about the axis A. When with the drive Z2 the rod S2 of the four-bar linkage corresponding to the linear drive A2 is changed, the platform P is pivoted about the axis B. Of course, in this embodiment two drives Z1, Z2 can also be simultaneously actuated in order to obtain the desired spatial position of the platform P. In addition, the linear drives A1 to A3 can be displaced along the linear guides G1 to G3.

Figure 10:
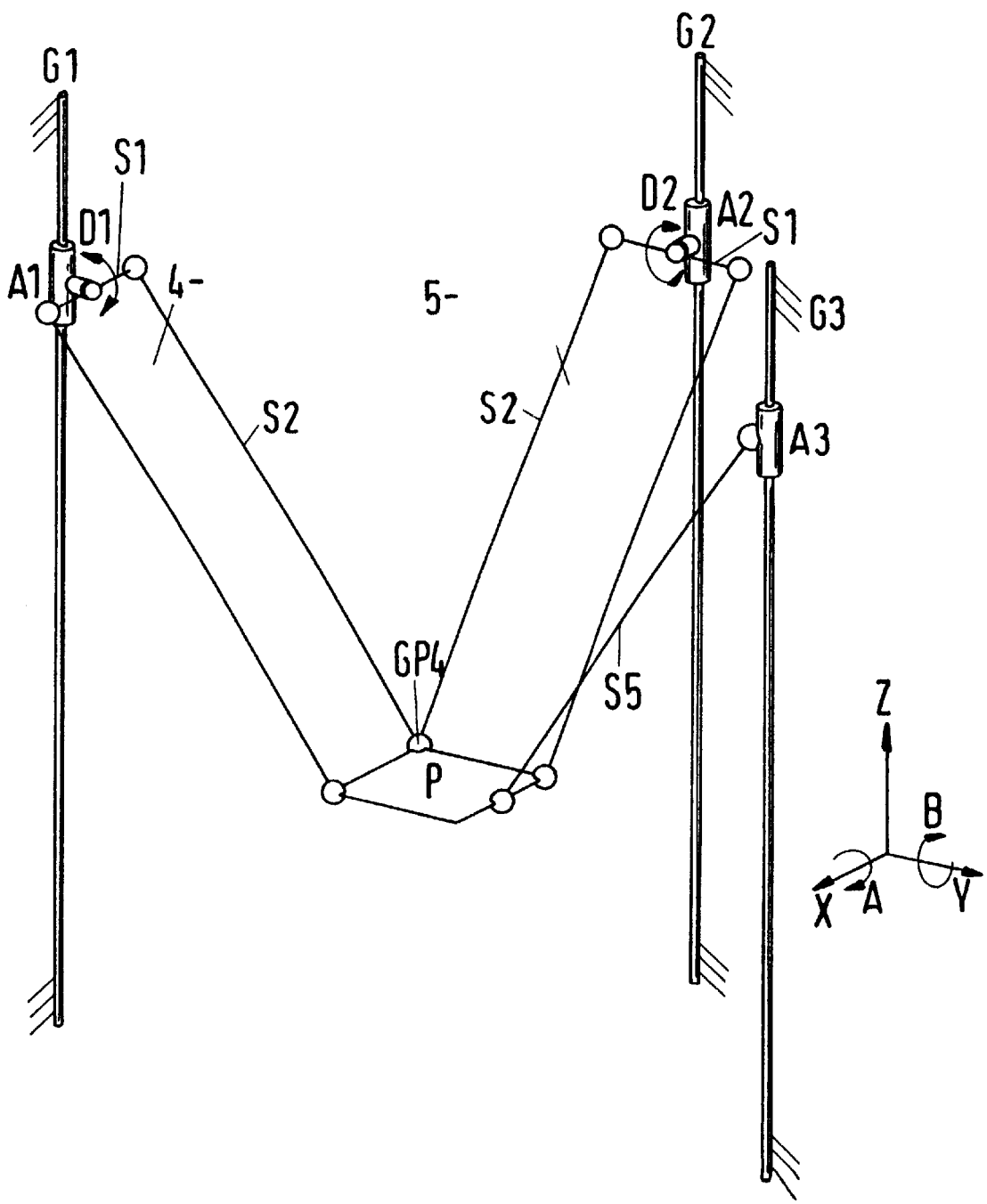
FIG. 10 is a perspective and simplified representation of a further embodiment of the inventive device.

In the device according to FIG. 10, the linear drives A1 and A2 are provided with rotary drives D1 and D2 with which the four-bar linkages can be pivoted about axes extending perpendicularly to the linear guides G1, G2. The design of the four-bar linkages themselves corresponds to the embodiment according to FIG. 1. The linear drive A3 is pivotably connected, as in the previous embodiment, by rod S5 to the platform P. With the rotary motors D1, D2 the rods S1 are pivoted about the disclosed axis in the direction of the double arrows in FIG. 10. The angles of the four-bar linkage are thus forcedly changed with the rotary drives D1 and D2. When the rotary drive D1 is actuated, an adjustment about the axis A results. Upon actuation of the rotary motor D2, an angular displacement about the axis B results. The four-bar linkage that is coordinated with the linear drive A1 has four axes; by adding the linear drive A2 with the rotary drive D2 and the corresponding four-bar linkage a five-axis kinematic mechanism results.

Figure 11:
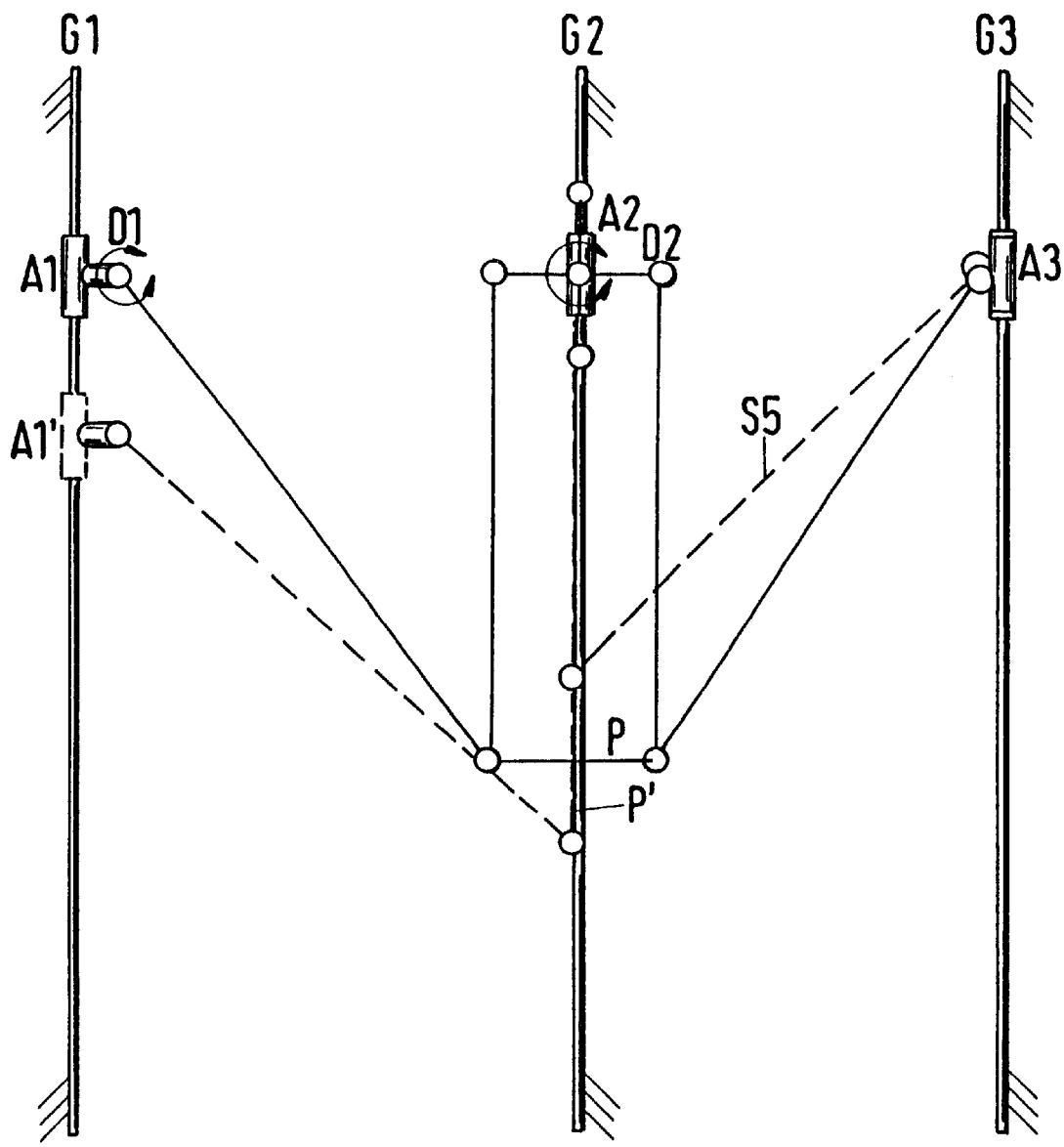
FIG. 11 is a front view of a further embodiment of the inventive device.
Figure 11A:
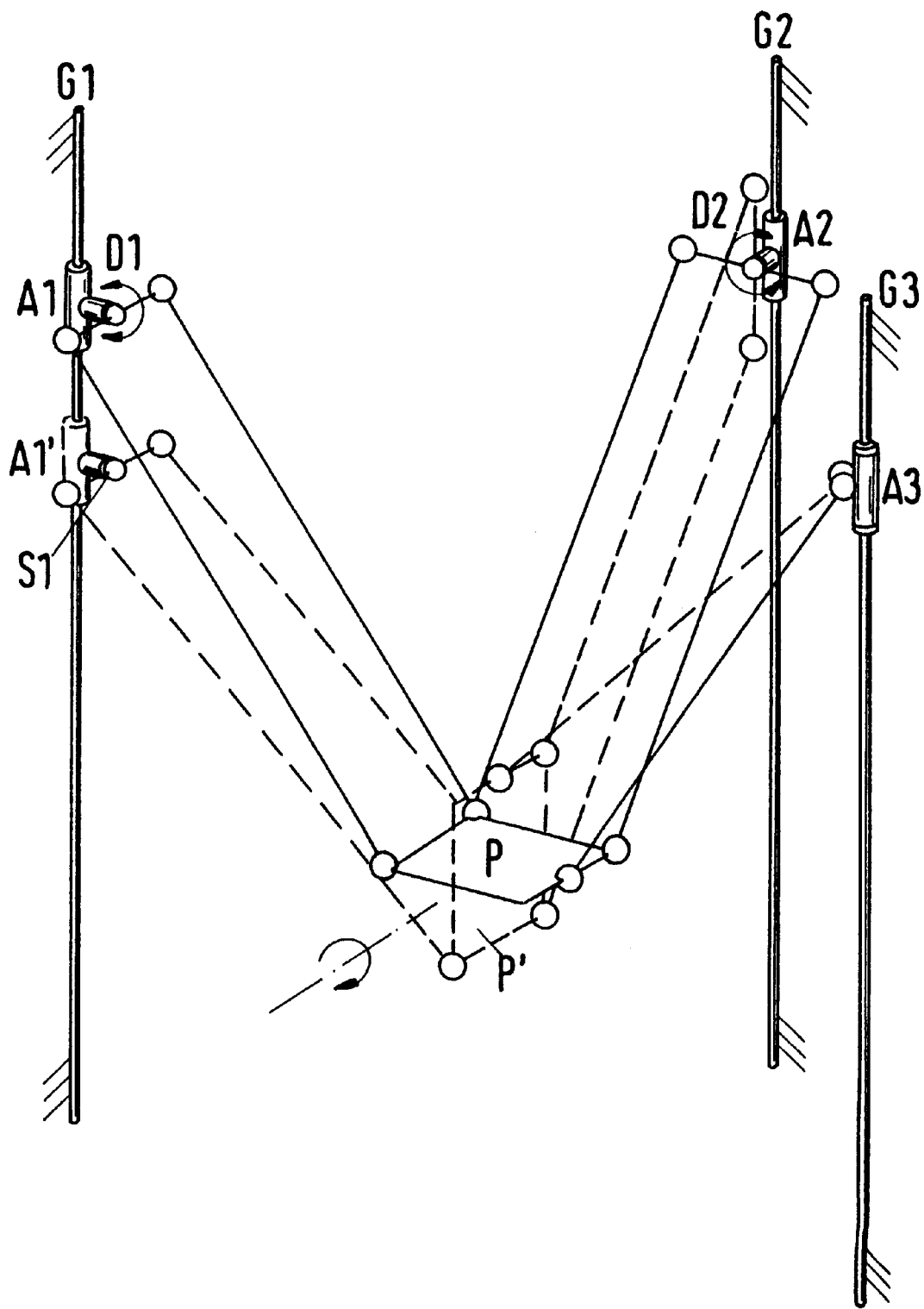
FIG. 11*a* shows the device according to FIG. 11 in a perspective view.

The FIGS. 11 and 11a show the device according to FIG. 10 in a side view and in a perspective representation whereby dashed lines indicate a respective displaced position of the platform P. The position in solid lines corresponds to the position of the platform P in FIG. 10 in which it extends horizontally in the space in an area between the linear guides G1 to G3. When with the rotary motor D2 the four-bar linkage is rotated about the axis extending perpendicularly to the linear guide G2 in the direction of the shown double arrow, the four-bar linkage reaches the position shown in dashed lines in FIGS. 11 and 11a in which the four-bar linkage is positioned in a plane in which the axis of rotation of the rotary drive D2 and also the linear guide G2 are located. The rod S5 is pivoted relative to the linear drive A3 into the position shown in dashed lines. At the same time, the linear drive A1 must be displaced along the linear guide G1 into the position A1' since due to the disclosed rotation with the rotary drive D2 the platform P has been rotated from the horizontal position into the vertical position P'. Since the rods of the four-bar linkage corresponding to the linear drive A1 cannot be changed in their position, the linear drive must be displaced into the position A1'. The rotary motor D1 is not actuated for this purpose so that during displacement of the linear drive A1 the four-bar linkage is only pivoted about the axis of the rod S1 connected to the rotary drive D1. As shown in FIGS. 11, 11a, due to the rotation of the platform P into the vertical position, the slanted position of the rods of the four-bar linkage coordinated with a linear drive A1 as well as of the rod S5 are changed.

In the same manner, the rotary motor D1 can also be actuated in order to rotated the corresponding four-bar linkage by 90° relative to the initial position according to FIG. 11, 11a (solid lines). In this case the platform P is moved into a vertical position which is, however, perpendicular to the two positions shown in FIG. 11a. The linear drive A2 must then be displaced correspondingly along the linear guide G2 in order to allow for pivoting of the platform P.

Figure 12:
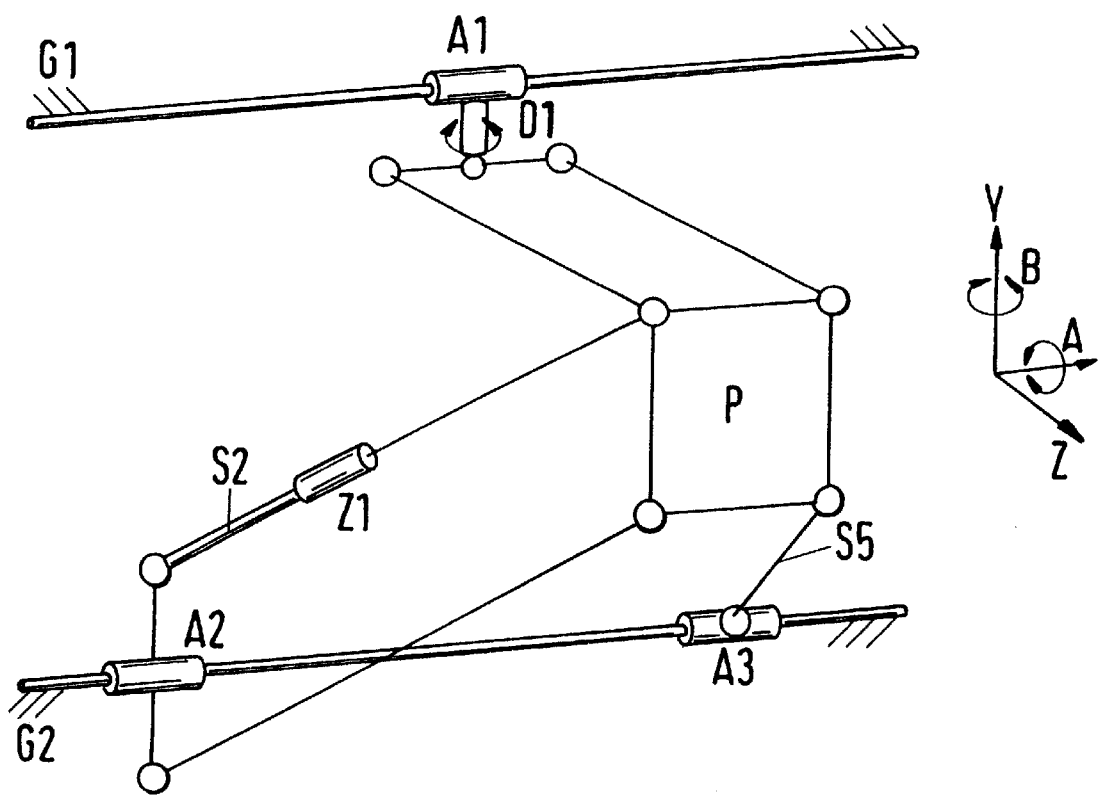
FIG. 12 is a side view of a further embodiment of the inventive device.

FIG. 12 shows a device with which the platform P can be moved by a relatively long stroke x. In this embodiment two parallel linear guides G1 and G2 fixedly connected to the frame are provided which, in contrast to the previous embodiment, are positioned horizontally, but, of course, can also be vertically or slantedly arranged. In the further embodiments to be described in the following the linear guides must not be vertically arranged but can have any other desired slanted position.

The linear drive A1 is displaceable along the linear guide G1. The linear guide G2 supports two linear drives A2 and A3. At the linear drive A1 the rotary drive (motor) D1 is arranged the rotational axis of which extends perpendicularly to the linear guide G1. With this rotary drive D1 the four-bar linkage can be rotated about the axis B. The four-bar linkage is embodied according to FIG. 1 and is pivotably connected to the platform P.

Figure 12A:
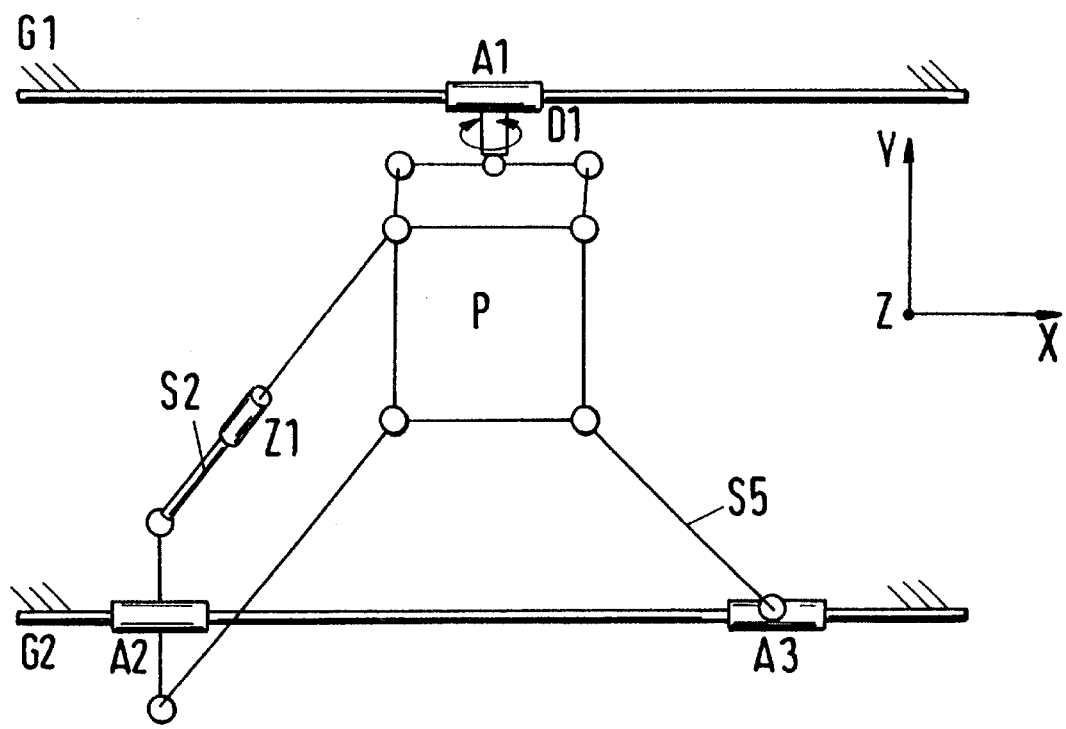
FIG. 12*a* shows a plan view of the device according to FIG. 12.
Figure 12B:
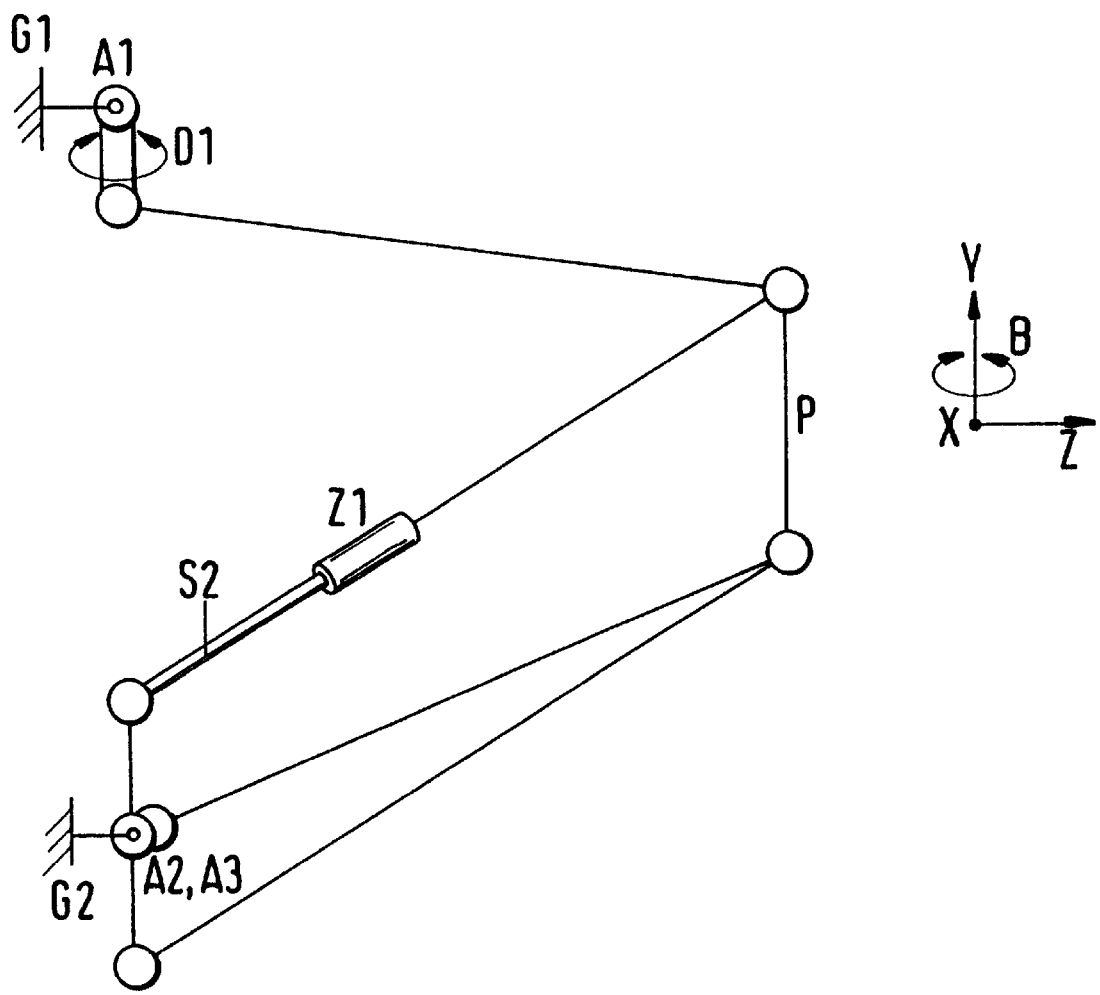
FIG. 12*b* shows a side view of the device of FIG. 12.

The linear drive A2 supports a four-bar linkage, according to the embodiment of FIG. 2, including the drive Z1 with which the rod S2 of the four-bar linkage can be position-adjusted. The linear drive A3 is pivotably connected with rod S5 to the platform P. FIG. 12a shows this device viewed in the direction of axis Z. The platform P projects from the plane of the drawing. FIG. 12b shows the device viewed in the direction x.

When it is desired to rotate the platform P about the axis A extending in the direction x, the drive Z1 is actuated so that the length of the rod S2 of the four-bar linkage coordinated with the linear drive A2 is changed. When it is desired to rotated the platform P about the axis B extending in the direction Y, the rotary drive D1 is actuated so that the corresponding four-bar linkage is pivoted about the axis B. If necessary, the adjustment of the platform P can be accompanied by a corresponding displacement of the respective linear drives A1 to A3 along the corresponding linear guides G1, G2 by a corresponding amount. Due to the rotary drive D1 the corresponding four-bar linkage has four axes.

The aforementioned embodiments are related to four-bar linkages which upon displacement of their rods always perform a movement within their plane. The following four-bar linkages and devices are embodied such that the rods themselves are provided with a rotatability. This also allows for an orientation and position change of the platform in space. The required rotational movement can be motorically continuously performed, for example, with a servo drive with or without gear etc. It is, however, also possible to employ a discrete, stepwise adjusting and positioning action with index pins, spline shafts, automatic form-locking connections with auxiliary energy etc.

Figure 13:
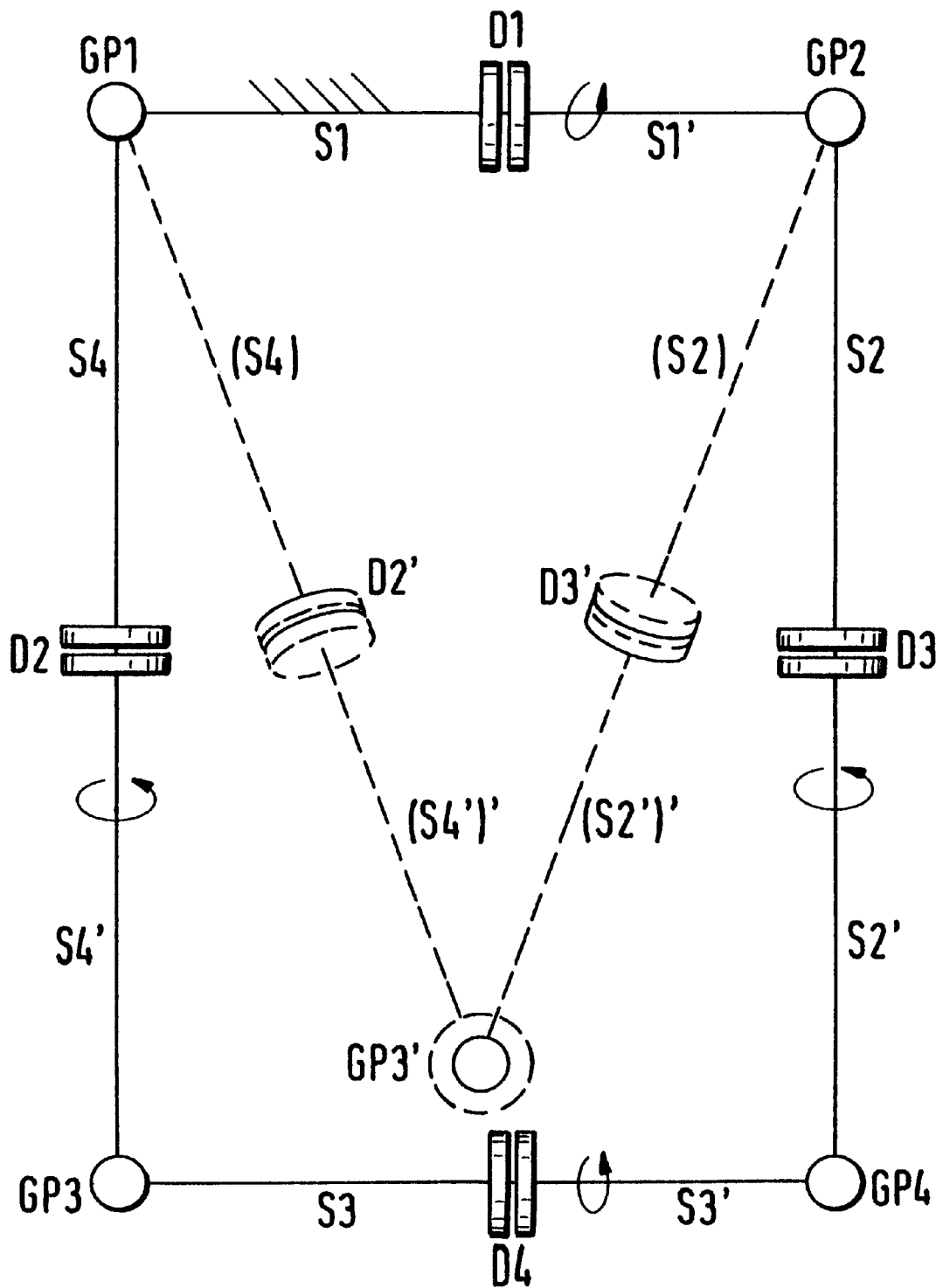
FIG. 13 shows a further embodiment of the four-bar linkage of the inventive device.

FIG. 13 shows a four-bar linkage in which the rods each are provided with a motoric drive D1 to D4. The four-bar linkage thus comprises rods S1/S1' with a rotary drive D1, S2/S2' with rotary motor D3, S3/S3' with rotary motor D4, and S4/S4' with rotary motor D2. When the rod part S1' is, for example, rotated by the rotary motor D1 about its axis relative to the rod part S1, the position shown in dashed lines in FIG. 13 is reached. The rods S1/S1' and S3/S3' as well as S2/S2' and S4/S4' thus form straight lines in space which are at a slant relative to one another. In the initial state (solid lines), the rods S1/S1' and S3/S3', respectively, S4/S4' and S2/S2' extend parallel to one another. After the disclosed rotation of the rod part S1' by the rotary drive D1, the rods S1/S1' and S3/S3' extend perpendicularly to one another.

In order to be able to spatially rotate the four-bar linkage, at least one motorically driven degree of rotation is required. In addition, at least three passive rotary joints in neighboring rods are required. When in the embodiment according to FIG. 13 the rotary drive D1 is the active rotary motor, the rotary motors D2 through D4 are passive rotary joints which are not rotatably driven. However, the rotary motor D3 may be motorically driven. In this case, the rotary motors D1, D2 and D4 are passive rotary joints. It is, however, also possible to provide two, three or four motorically driven pivot or rotary joints. They would increase the rotary stability in an arrangement as shown.

The pivot points GP1 to GP4 with which the respective rods are pivotably connected at their ends, can be designed such that they have only one degree of freedom, which in the embodiment according to FIG. 13 is within the plane of the drawing. The pivot points GP1 to GP4 can however also be embodied as a ball joint, as is shown in an exemplary manner in FIG. 16. Then only two rotary degrees of freedom are provided in the parallel extending rods S2/S2' and S4/S4' whereby at least one of the rotary joints is motorically driven.

Figure 14:
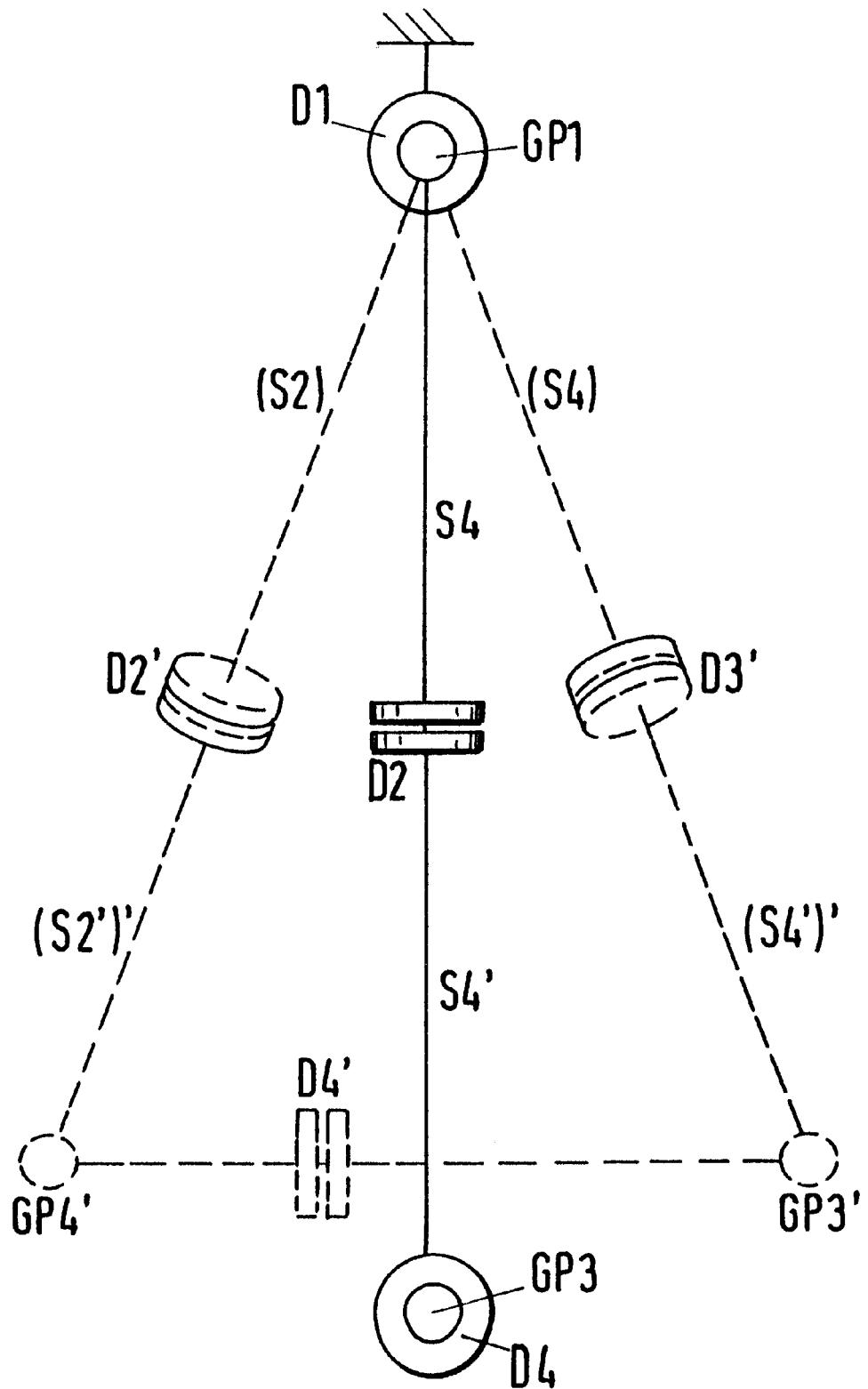
FIG. 14 shows a side view of the four-bar linkage according to FIG. 13.

FIG. 14 shows the four-bar linkage according to FIG. 13 in a side view. With solid lines the initial position is represented, while the dashed lines show the position of the four-bar linkage resulting from rotation by the rotary drive D1 within the rod S1/S1'.

Figure 15:
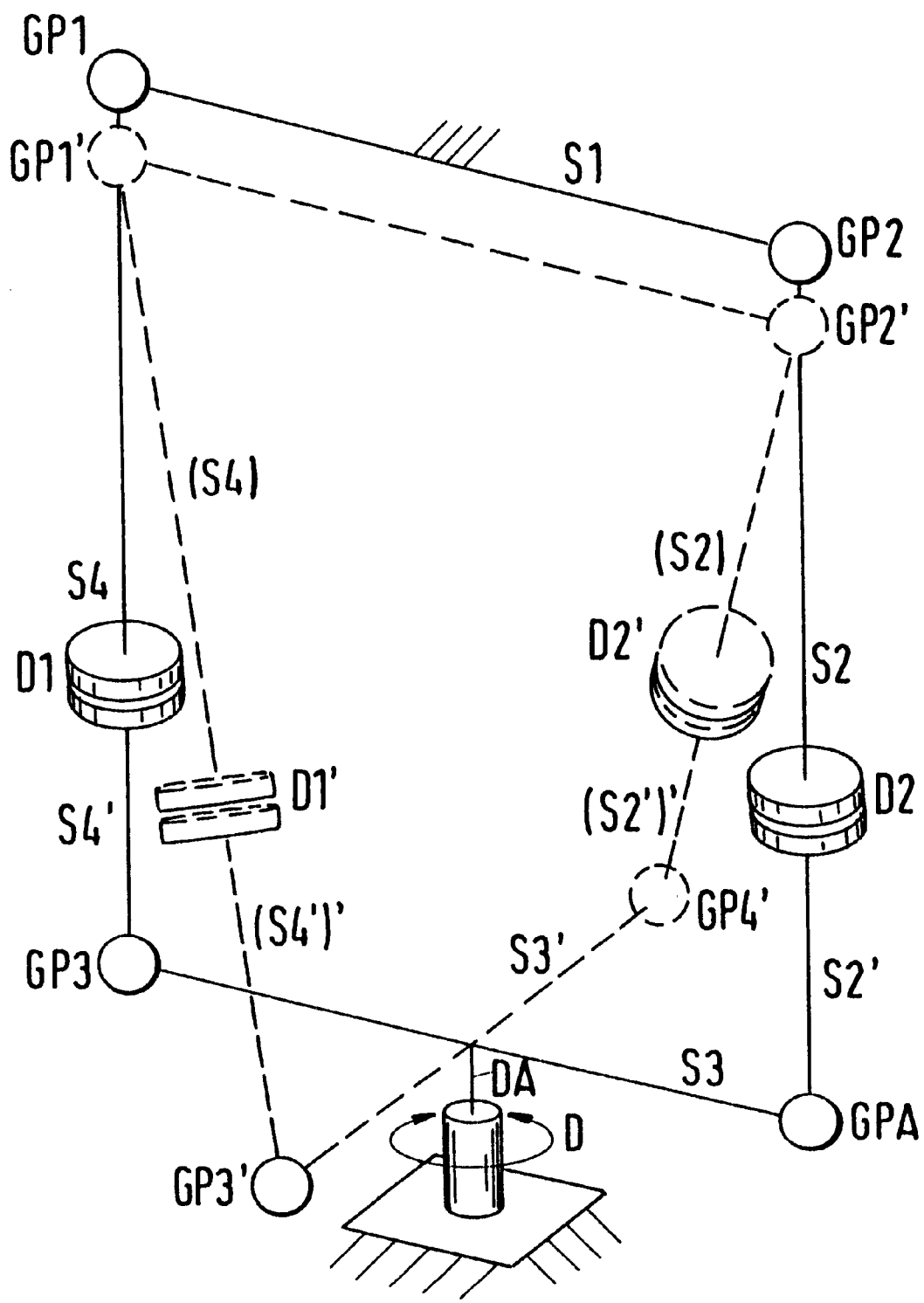
FIG. 15 shows a further embodiment of the four-bar linkage of the inventive device in a simplified perspective representation.
Figure 15A:
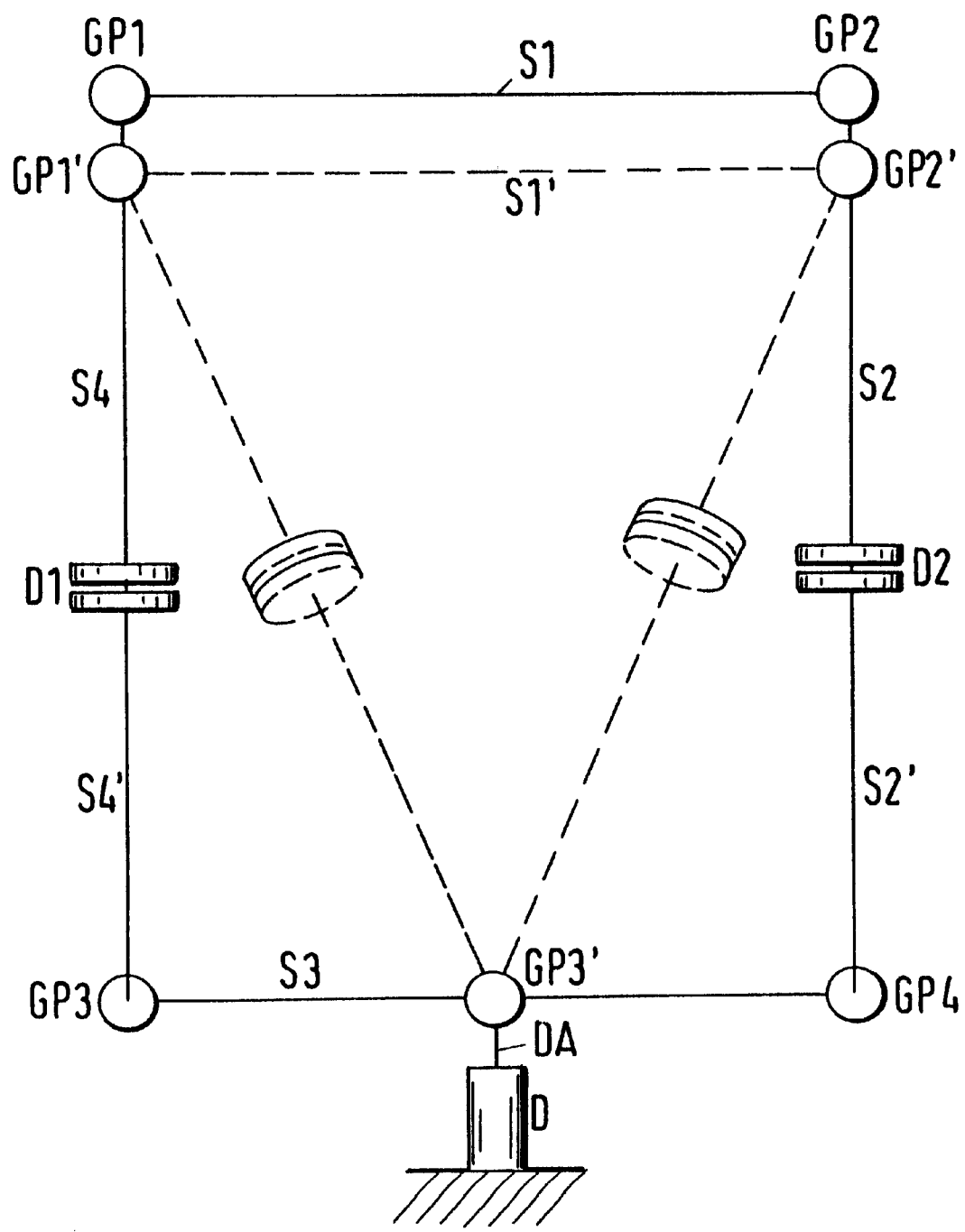
FIG. 15*a* shows a front view of the four-bar linkage according to FIG. 15.

In the embodiment according to FIG. 15 the parallel-extending rods S2/S2' and S4/S4' are each provided with a rotary drive D2, D1. The rod S1, which at its ends has the pivot points GP1 and GP2, is arranged parallel to the rod S3 which is pivotably connected with pivot points GP3 and GP4 to the adjacent rods S4/S4' and S2/S2'. The rod S3 is positioned on a shaft of a rotary drive D fixedly connected to the frame whereby the shaft extends perpendicularly to the rod S3. The axis of rotation DA of the rotary drive D is positioned at half the width of the rod S3. With the rotary drive D the rod S3 can be rotated about the axis DA. Accordingly, the four-bar linkage is rotated out of the initial plane of the rest position represented in solid lines. In FIGS. 15 and 15a the rod S3 is rotated by the rotary drive D to such an extent that it extends perpendicularly to its initial position. Since the rotary drive D is fixedly connected to the frame, the oppositely arranged rod S1 is translatorically displaced into the position S1'. Due to the rotation of the rod S3, the rods S2/S2' and S4/S4' also change their spatial position which is indicated by the dashed lines in FIGS. 15 and 15a. With the rotary drives D1, D2 the rod parts S4' and S2' can also be rotated about their axes relative to the remaining rod parts S4, S2 in the aforedescribed manner.

The rotary drive D which produces an orientational change by changing the angular position at the pivot points, can also be provided at one of the other rods of the four-bar linkage.

Figure 16:
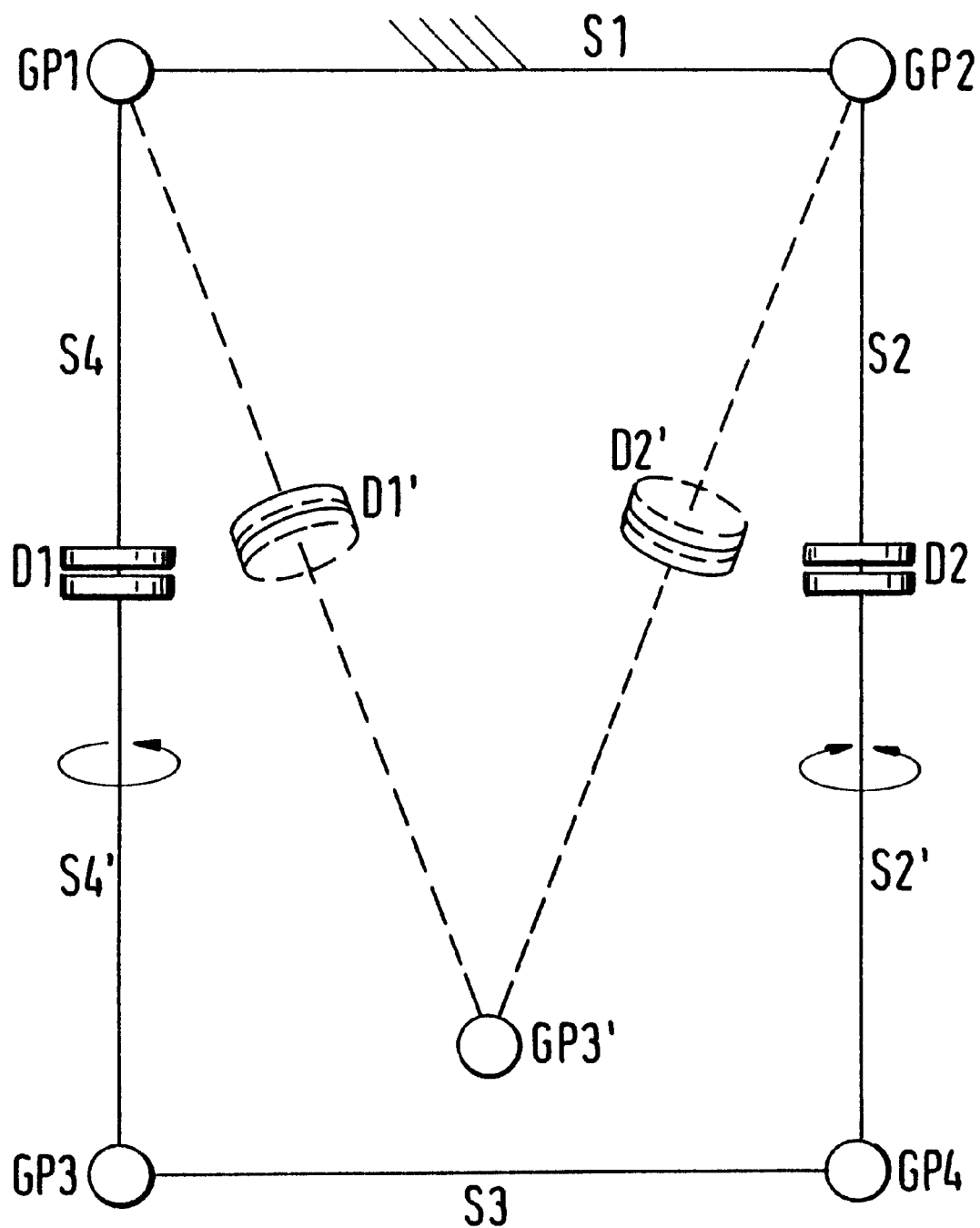
FIG. 16 shows a side view of a further embodiment of a four-bar linkage of the inventive device.

In the disclosed embodiments of the four-bar linkages according to FIGS. 13, 15, and 16, the orientation of the rods S3/S3' to S1/S1' respectively, S1 to S3 is forcedly guided with respect to one degree of freedom. This forced guiding can be prevented with an additional degree of freedom so that any desired orientation between the rods S1/S1' and S3/S3', respectively, S1 and S3 can be adjusted. For this purpose, at least one active rectilinear sliding joint Z1 is to be integrated, for example, into the rod S4/S4'. However, it is also possible to provide two additional active rectilinear sliding joints Z1 and Z2 in the rods S4/S4' and S2/S2'.

Figure 16A:
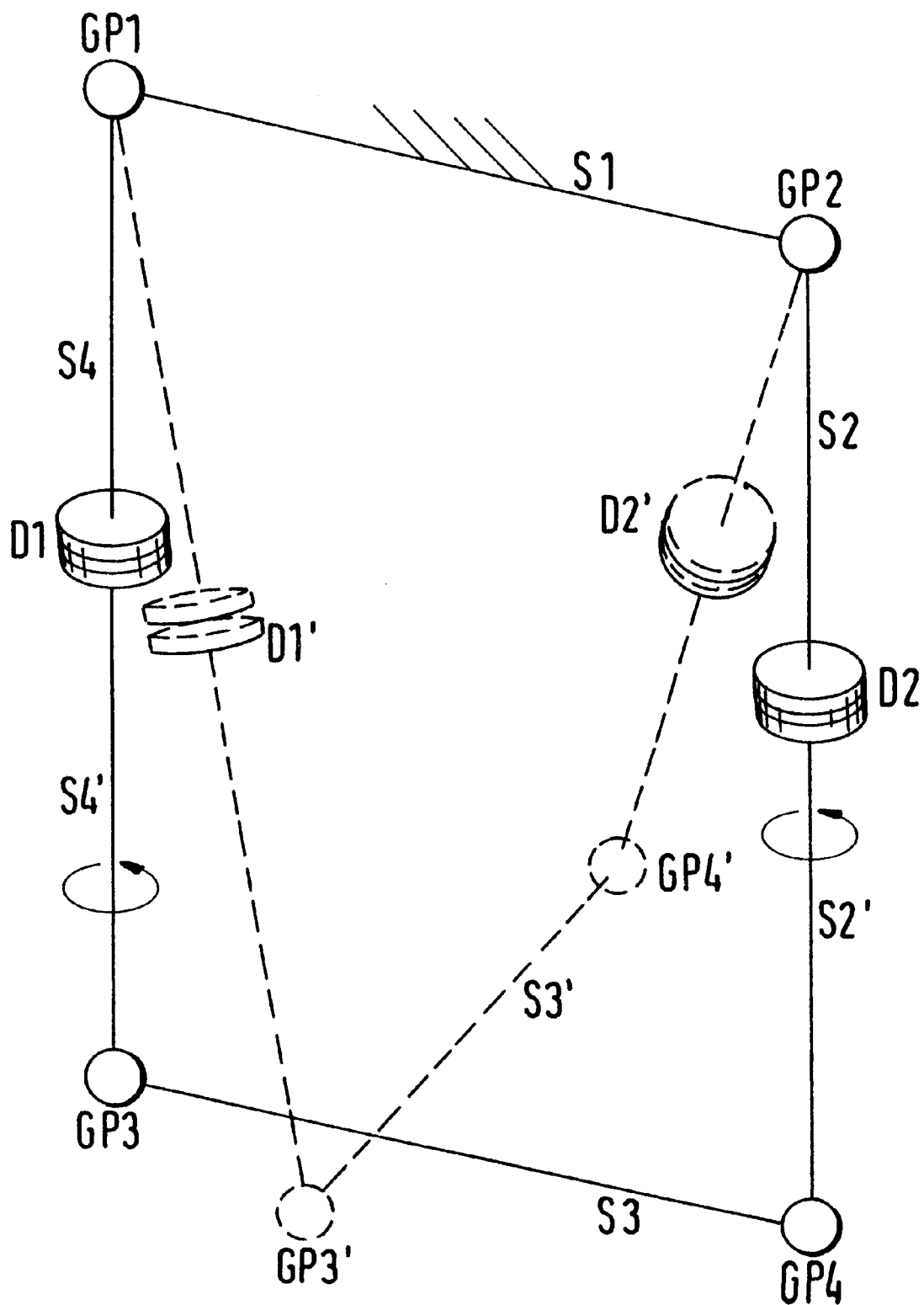
FIG. 16*a* shows the four-bar linkage according to FIG. 16 in a perspective view.

FIGS. 16 and 16a show a four-bar linkage in which in the parallel rods S4/S4' and S2/S2' a rotary drive D1, D2 is located, respectively. With it the rod parts S4' and S2' can be rotatingly driven relative to the remaining rod parts 54, 52. Accordingly, the rod S3 is moved from its initial position, shown in solid lines, into the position S3', indicated in dashed lines. While in the embodiment according to FIG. 15, 15a the four-bar linkage is rotated with the additional rotary drive D from its original plane, in the embodiment according to FIGS. 16, 16a the rod parts S2' and S4' are rotated by the rotary drives D1, D2 for rotation out of the plane of the four-bar linkage from the initial position (solid lines). One of the two rotary drives D1, D2 is active, i.e., with it the rotary movement is generated. The other rotary drive is passive, i.e., it forms only a rotary joint.

Figure 17:
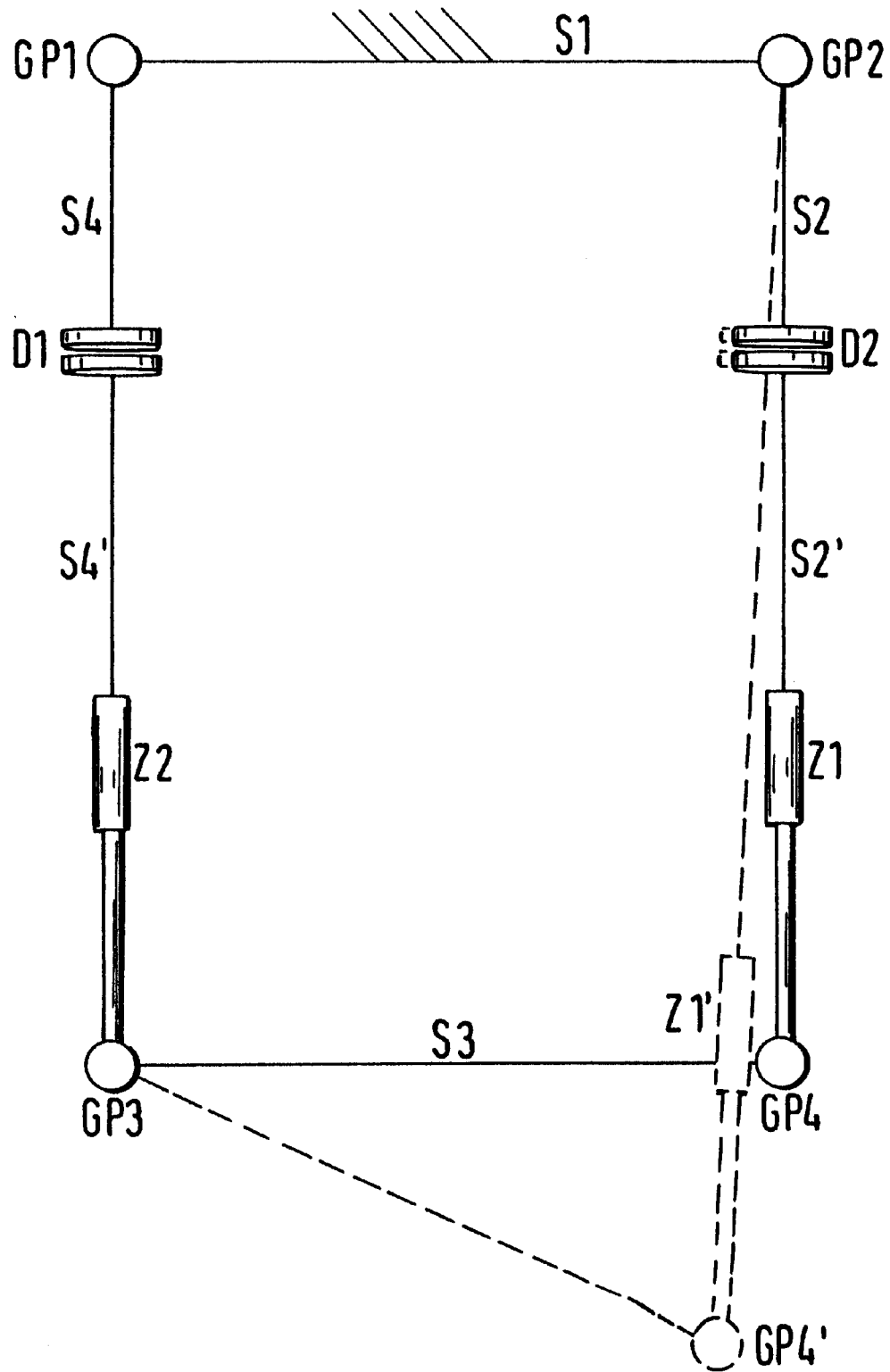
FIG. 17 shows a front view of a further embodiment of a four-bar linkage of the inventive device.

In FIG. 17, the four-bar linkage according to FIG. 16, 16a is represented in which two additional active rectilinear sliding joints Z1 and Z2 are integrated into the rods S2/S2' and S4/S4'. With the active rectilinear sliding joints Z1, Z2, in the manner disclosed above, the position of the respective rods S2/S2' and S4/S4' is changed. With the rotary drives D1, D2, provided within the rods, the rod parts S2', S4' can be additionally rotated about their axes. In FIG. 17 the dashed line shows the case in which the active rectilinear sliding joint Z1 increases the length of the rod element S2/S2'. Thus, the angular position of the rods S3 and S2/S2' is changed in the manner disclosed. When such four-bar linkages are used in a device, the system behavior of the device in such an embodiment is substantially improved.

The rectilinear sliding joints Z1, Z2 can be piston/cylinder units, spindle/nut systems etc.

Figure 18:
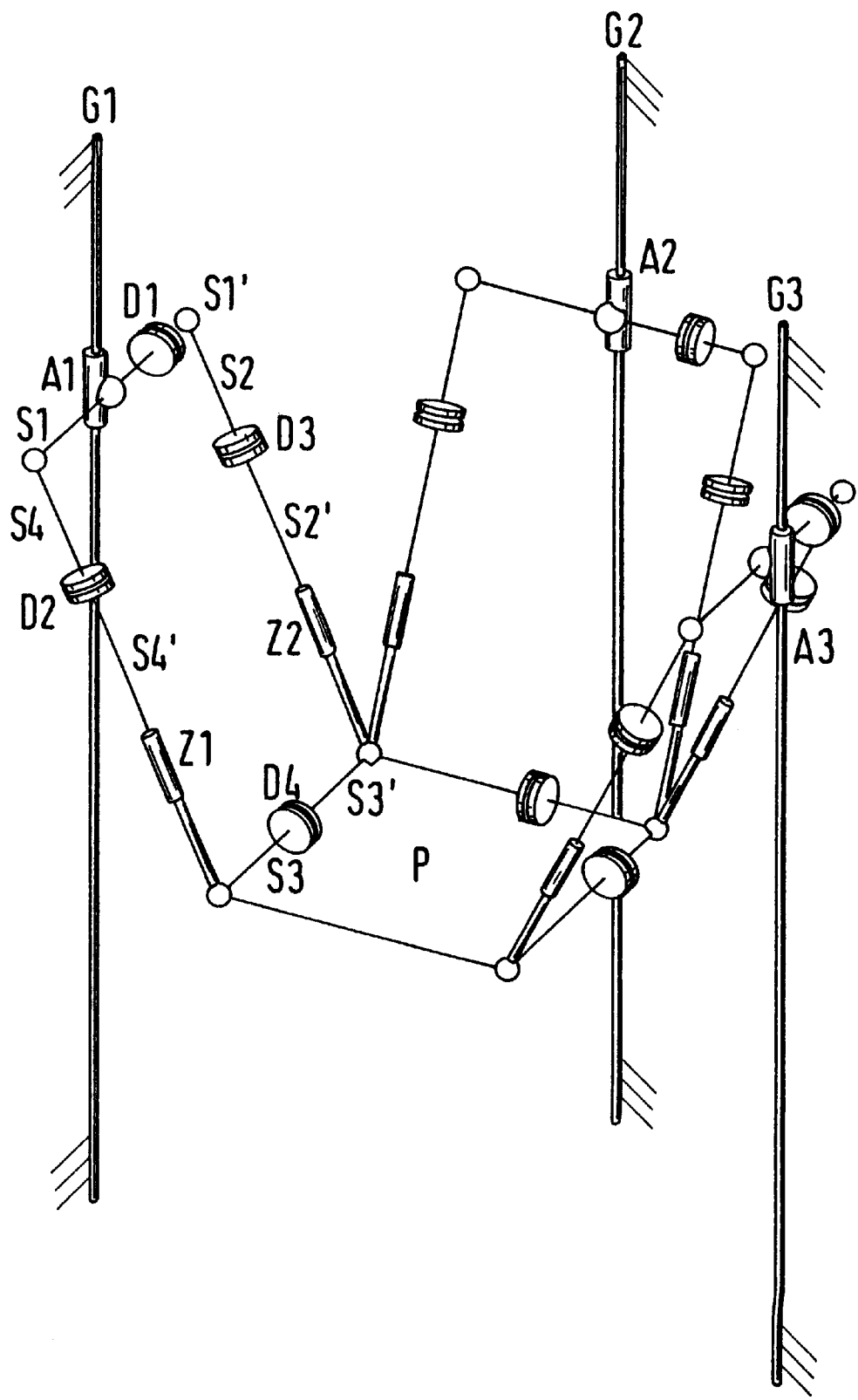
FIG. 18 shows in a simplified perspective representation a further embodiment of the inventive device.

FIG. 18 shows an embodiment of a device in which four-bar linkages according to FIG. 13 are provided whereby the rods S2/S2' and S4/S4' have integrated therein a respective rectilinear sliding joint Z1, Z2. The device has linear guides G1 to G3 that extend parallel to one another and are fixedly connected to the frame and on which linear drives A1 to A3 are displacable. With the linear drives A1 to A3 the positioning of the platform P is performed.

The four-bar linkages coordinated with the linear drives A1 to A3 are of identical design so that in the following only the linear drive A1 with its corresponding four-bar linkage will be explained. It comprises the rod S1/S1', which extends perpendicularly to the linear guide G1 and which is rotatably supported within the linear drive A1. With the rotary drive D1 the rod part S1' can be rotated about its axis relative to the rod part S1 in the manner disclosed above. At its ends the rod S1/S1' is pivotably connected in the manner disclosed above with the rods S2/S2' and S4/S4' in which a respective rotary drive D3 or D2 is positioned. With these rotary drives the rod parts S4' and S2' can be rotated about their axes relative to the other rod parts S4 and S2. The rod S3/S3' is positioned parallel to the rod S1/S1' and has pivotably connected thereto the parallel rods S2/S2' and S4/S4'. In the rod S3/S3' a rotary drive D4 is positioned with which the rod part S3' can be rotated about its axis relative to the rod remaining part S3.

In the rods S2/S2' and S4/S4' an active rectilinear sliding joint Z1, Z2 is provided. With these rectilinear sliding joints the length of the rods S2/S2' and S4/S4' can be changed in the described manner. With the rotary drives D1 to D4 and the rectilinear sliding joints Z1, Z2 the platform P can be adjusted into the desired orientational position. The platform P is pivotably connected to the four-bar linkages of the device.

Figure 18A:
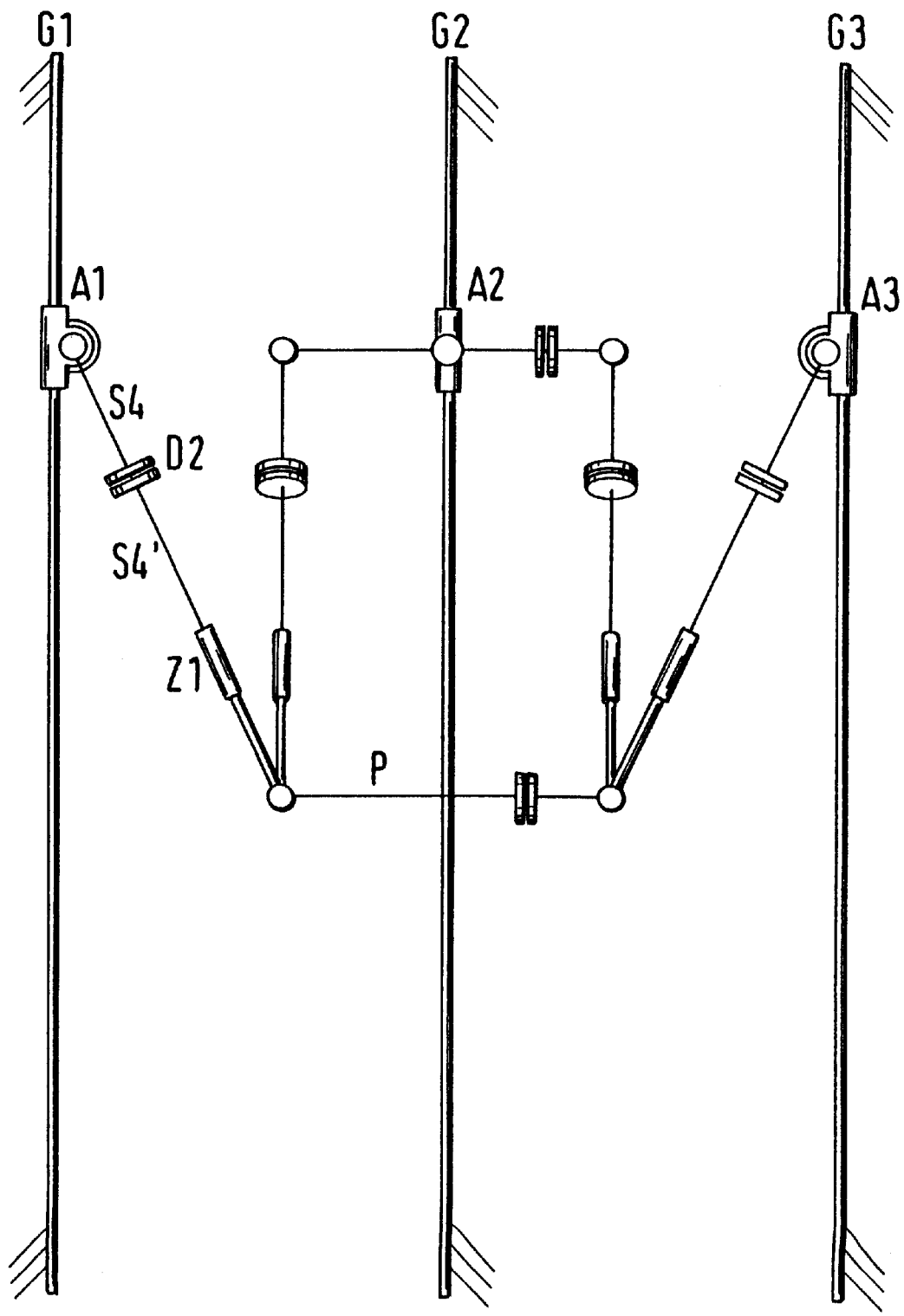
FIG. 18*a* shows a front view of the device according to FIG. 18.
Figure 18:
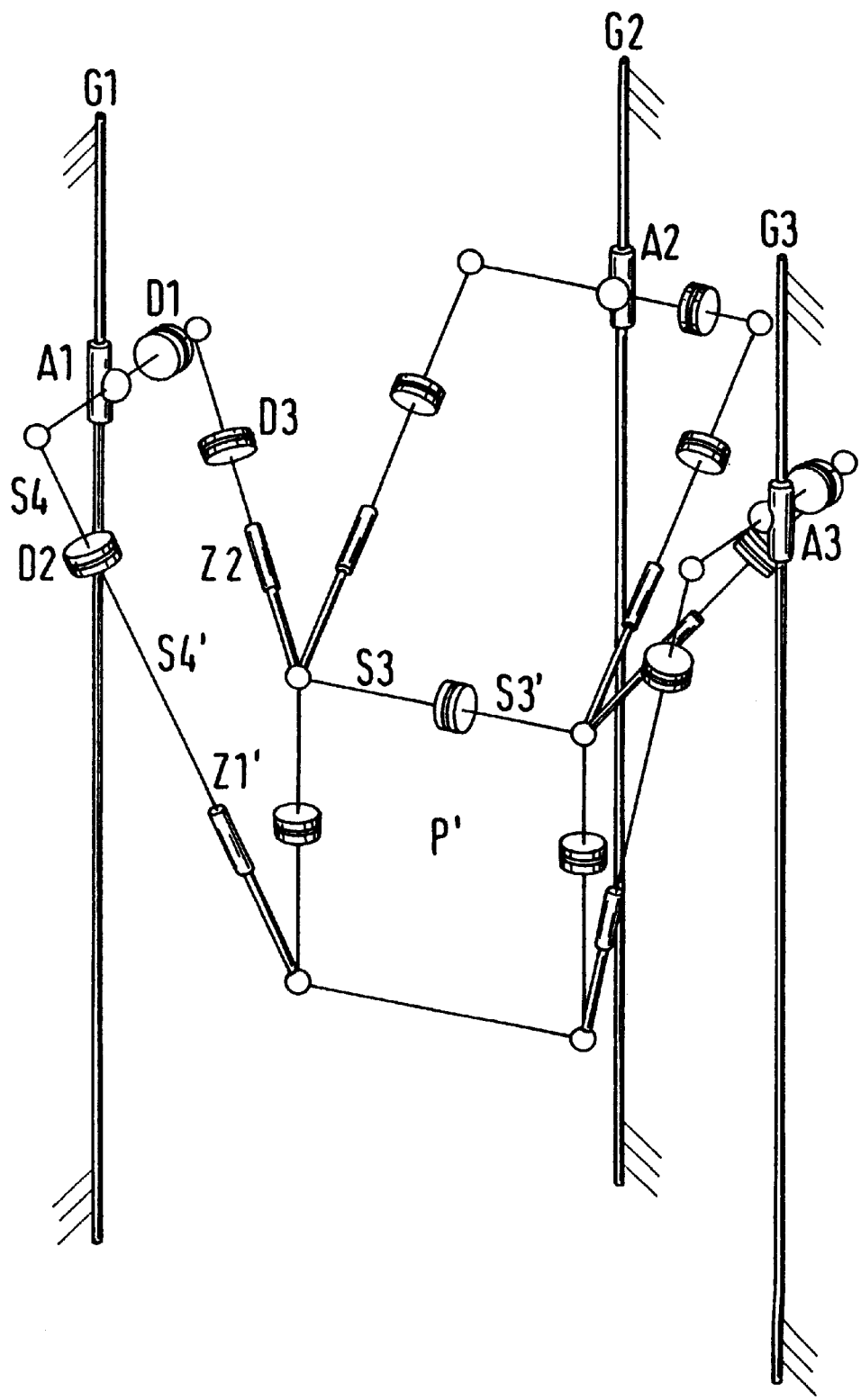

FIG. 18b shows exemplary an adjusted position of the platform P. With the active rectilinear sliding joints Z1, Z2 in the different four-bar linkages the platform P has been pivoted from the horizontal position according to FIG. 18 and 18a into vertical position. The pivot axis is determined in this case by the rod S3/S3' of the four-bar linkage corresponding to the linear drive A2. With the different active rectilinear sliding joints the platform can be adjusted into any desired spatial position with respect to its orientation. The rods of the four-bar linkages can perform the required rotational and pivot movements.

Figure 19:
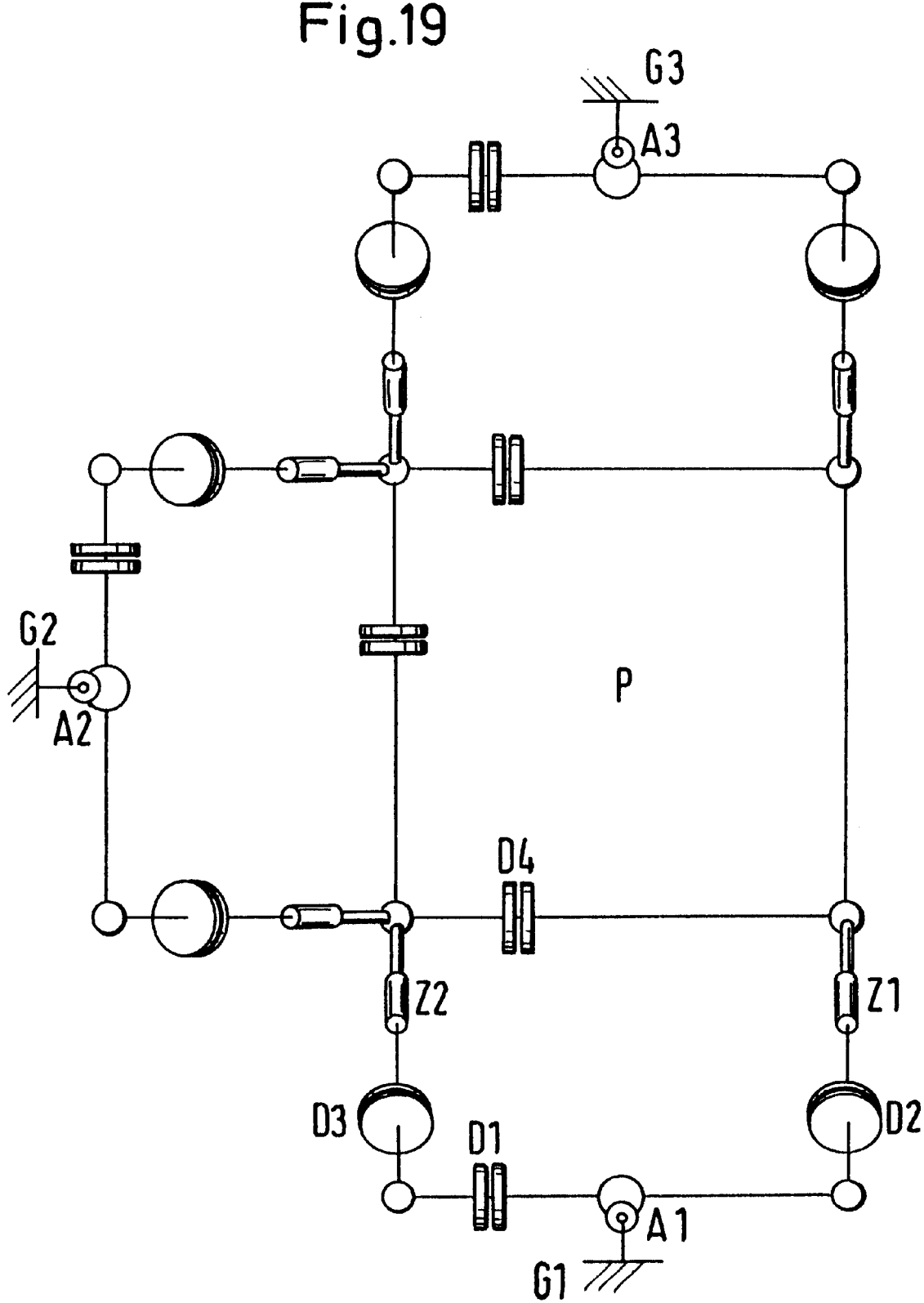
FIG. 19 shows a plan view of the inventive device of FIG. 18.
Figure 19A:
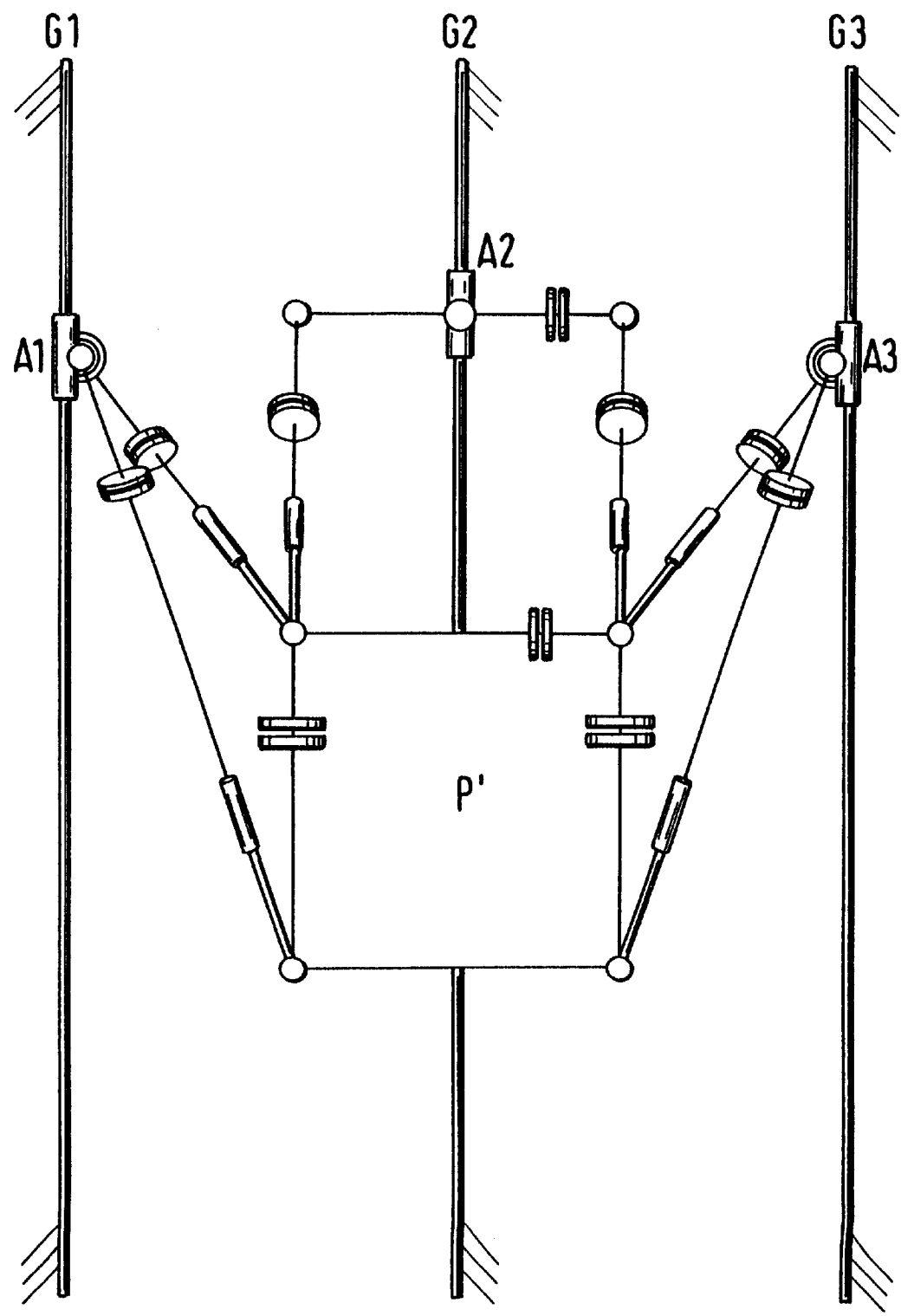
FIG. 19*a* shows a front view of the device according to FIG. 18*b;*

FIG. 19 shows the device according to FIG. 18 in a plan view whereby the platform P is in its horizontal position. FIG. 19a shows the device in a front view whereby the platform is pivoted into the vertical position P'.

Figure 19B:
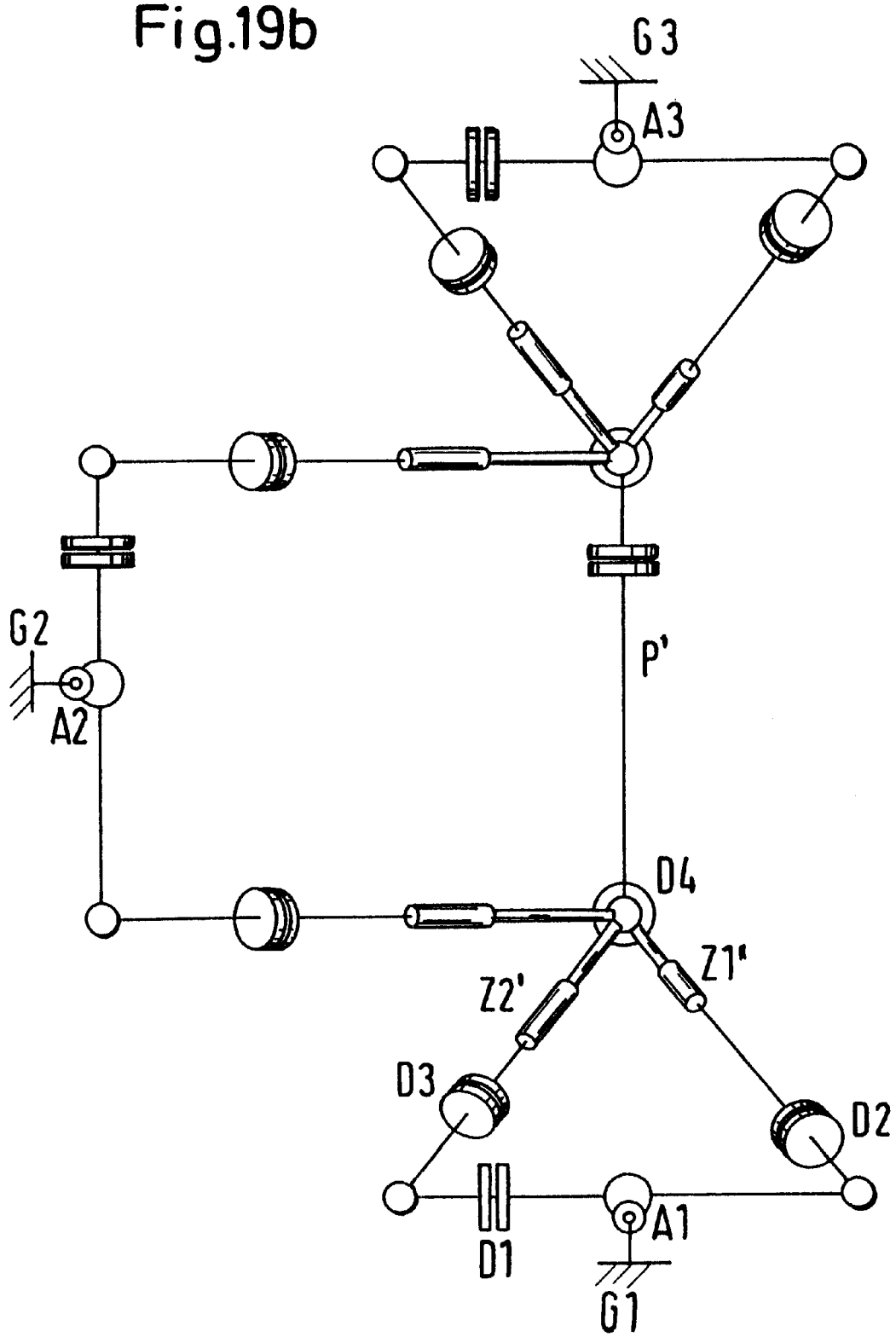
FIG. 19*b* shows the device according to FIG. 19 with displaced platform in a plan view.

FIG. 19b shows a plan view of the device when the platform is in its vertical position P'. Since the four-bar linkages corresponding to the linear drives A1 and A3 engage with their rods the upper and lower corners of the platform P' the four-bar linkages have been rotated out of their initial plane of movement so that the pivot points of the four-bar linkages at the platform P' are in front of and behind the plane of the drawing. The required positional changes of the rods of the four-bar linkage can be easily performed with the aforementioned embodiment.

Figure 20:
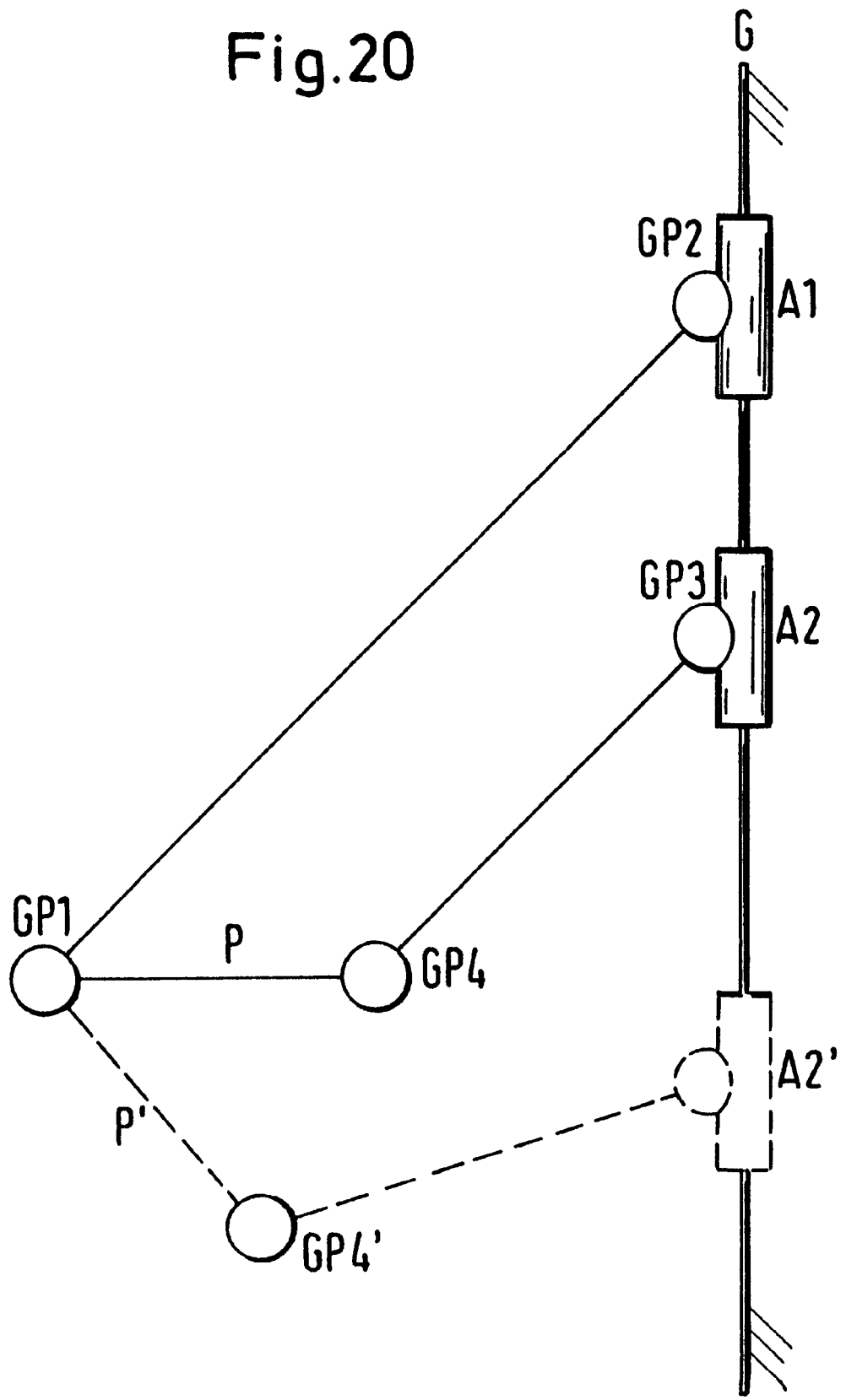
FIG. 20 shows a further embodiment of the four-bar linkage of the inventive device in a schematic representation.

FIG. 20 shows a device in which further possibilities for changing the orientation of the platform P via the angular position of the pivot points GP1 to GP4 of the four-bar linkage are possible. The pivot points GP2 and GP3 are changed in their relative distance to one another via the additionally provided linear drives A2 which moves along the same base construction as the linear drive A1. When the linear drive A2 is displaced from the initial position indicated in solid lines into the position A2', indicated in dashed lines, an orientational change of the platform P into the position P' results. Of course, in this arrangement the rods, as shown exemplary in FIG. 13 to 17, can have additional adjusting drives for orientational changes via the spatial four-bar linkage.

The present invention is, of course, in no way restricted to the specific disclosure of the specification and drawings, but also encompasses any modifications within the scope of the appended claims.

What we claim is:

1. A device comprising at least one platform and rod elements, said rod elements arranged in at least one four-bar linkage, wherein said at least one four-bar linkage has four of said rod elements connected to one another to form a quadrangle, said at least one four-bar linkage pivotably connected to said at least one platform, wherein an angular position of said at least one four-bar linkage is motorically adjustable for changing an orientation of said at least one platform.

2. A device according to claim 1, wherein at least one of said rod elements of said at least one four-bar linkage is motorically adjustable for changing said angular position.

3. A device according to claim 2, further comprising a rotary drive for adjusting the angular position.

4. A device according to claim 3, wherein said at least one rod element is rotatable by said rotary drive about a rotary axis extending angularly to said rotary drive.

5. A device according to claim 4, wherein said rotary axis extends perpendicularly to said rotary drive.

6. A device according to claim 2, wherein said at least one rod element is motorically length-adjustable for changing said angular position.

7. A device according to claim 6, further comprising a rectilinear sliding joint for length-adjusting said at least one length-adjustable rod element.

8. A device according to claim 7, wherein said rectilinear sliding joint is integrated in said at least one length-adjustable rod element.

9. A device according to claim 7, further comprising at least one connecting arm, wherein said rectilinear sliding joint is connected with said at least one connecting arm to said at least one length-adjustable rod element.

10. A device according to claim 2, wherein said at least one four-bar linkage has a plane rest position and is moveable out of said plane rest position in a direction transverse to said plane rest position.

11. A device according to claim 10, further comprising a rotary drive, wherein one of said at least one rod elements has a transverse center axis, extending perpendicularly to a longitudinal extension of said one rod element, and is rotatable by said rotary drive about said transverse center axis.

12. A device according to claim 2, further comprising a rotary drive and a rectilinear sliding joint connected to one of said rod elements.

13. A device according to claim 12, further comprising at least one linear drive, connected to one of said at least two four-bar linkages, for positioning said at least one platform.

14. A device according to claim 13, comprising two of said linear drives, wherein two of said rod elements of said one of said at least two four-bar linkage are pivotably connected to one of said linear drives, respectively.

15. A device according to claim 14, further comprising a common linear guide, wherein said two linear drives are displaceable on said common linear guide.

16. A device according to claim 1, wherein said angular position is adjustable by rotating at least one rotatable part of one of said at least one rod elements about a longitudinal axis of said at least one rod element.

17. A device according to claim 16, further comprising a rotary drive connected to one of said at least one rod elements for rotating said at least one rotatable part relative to a remaining part of said at least one rod element about said longitudinal axis of said at least one rod element without elongating said at least one rod element, wherein said rotary drive connects said at least one rotatable part and said remaining part.

18. A device according to claim 1, comprising at least two of said four-bar linkages for supporting said at least one platform.

* * * * *